(12) United States Patent
Cannon et al.

(10) Patent No.: US 10,861,023 B2
(45) Date of Patent: Dec. 8, 2020

(54) METHOD AND SYSTEM FOR QUESTION PRIORITIZATION BASED ON ANALYSIS OF THE QUESTION CONTENT AND PREDICTED ASKER ENGAGEMENT BEFORE ANSWER CONTENT IS GENERATED

(71) Applicant: Intuit Inc., Mountain View, CA (US)

(72) Inventors: Matthew Cannon, San Diego, CA (US); Todd Frey Goodyear, San Diego, CA (US); Igor A. Podgorny, San Diego, CA (US); Christopher C. Gielow, Carlsbad, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 16/587,435

(22) Filed: Sep. 30, 2019

(65) Prior Publication Data

US 2020/0027095 A1 Jan. 23, 2020

Related U.S. Application Data

(62) Division of application No. 14/812,066, filed on Jul. 29, 2015, now Pat. No. 10,475,044.

(51) Int. Cl.
*G06Q 30/00* (2012.01)
*G06Q 10/06* (2012.01)

(52) U.S. Cl.
CPC ... *G06Q 30/016* (2013.01); *G06Q 10/063116* (2013.01)

(58) Field of Classification Search
CPC .................................................. G06Q 30/016
See application file for complete search history.

(56) References Cited

U.S. PATENT DOCUMENTS 5,471,382 A  11/1995 Tallman et al.
5,519,608 A   5/1996 Kupiec
(Continued)

FOREIGN PATENT DOCUMENTS

AU    2001259223 B2   11/2001
CN      101520802      4/2009
(Continued)

OTHER PUBLICATIONS

Fitchett et al., "An Empirical Characterisation of File Retrieval," Oct. 3, 2014, University of Canterbury, Christchurch, New Zealand, Int. J. Human-Computer Studies 74 (2015), pp. 1-13 (Year: 2014).
(Continued)

*Primary Examiner* — Kurtis Gills
(74) *Attorney, Agent, or Firm* — Paradice and Li LLP

(57) ABSTRACT

Before routing a question submitted to a question and answer based customer support system to support resources, and before any specific answer data is generated, the submitted question data is analyzed to predict asking user engagement with the question and answer based customer support system after the asking user's question is submitted. In this way, the question itself is analyzed and questions determined to be low engagement probability questions submitted by asking users that have a low probability of further engagement with the question and answer based customer support system are provided to the support resources on a low priority basis and questions determined to be high engagement probability questions submitted by asking users that have a high probability of further engagement with the question and answer based customer support system are provided to the support resources on a high priority basis.

20 Claims, 8 Drawing Sheets

(56) References Cited

U.S. PATENT DOCUMENTS

| | | | |
|---|---|---|---|
| 5,701,399 A | 12/1997 | Lee et al. | |
| 6,006,218 A | 12/1999 | Breese et al. | |
| 6,147,975 A | 11/2000 | Bowman-Amuah | |
| 6,256,633 B1 | 7/2001 | Dharap | |
| 6,349,307 B1 | 2/2002 | Chen | |
| 6,513,036 B2 | 1/2003 | Fruensgaard et al. | |
| 6,564,213 B1 | 5/2003 | Ortega et al. | |
| 6,601,055 B1 * | 7/2003 | Roberts | G06K 9/6293 706/45 |
| 6,708,172 B1 | 3/2004 | Wong et al. | |
| 6,853,982 B2 | 2/2005 | Smith et al. | |
| 7,013,263 B1 | 3/2006 | Isaka et al. | |
| 7,222,078 B2 | 5/2007 | Abelow | |
| 7,385,716 B1 | 6/2008 | Skaanning | |
| 7,565,312 B1 | 7/2009 | Shaw et al. | |
| 7,587,387 B2 | 9/2009 | Hogue | |
| 7,594,176 B1 | 9/2009 | English | |
| 7,603,301 B1 | 10/2009 | Regan | |
| 7,610,226 B1 | 10/2009 | Miller | |
| 7,627,504 B2 | 12/2009 | Brady et al. | |
| 7,685,144 B1 | 3/2010 | Katragadda | |
| 7,739,286 B2 | 6/2010 | Sethy et al. | |
| 7,747,601 B2 | 6/2010 | Cooper et al. | |
| 7,966,282 B2 | 6/2011 | Pinckney et al. | |
| 7,974,860 B1 | 7/2011 | Travis | |
| 8,010,545 B2 | 8/2011 | Stefik et al. | |
| 8,019,753 B2 | 9/2011 | Podgorny et al. | |
| 8,200,527 B1 * | 6/2012 | Thompson | G06Q 10/0639 705/7.39 |
| 8,209,333 B2 | 6/2012 | Hubbard et al. | |
| 8,311,792 B1 | 11/2012 | Podgorny et al. | |
| 8,311,863 B1 | 11/2012 | Kemp | |
| 8,341,167 B1 | 12/2012 | Podgorny et al. | |
| 8,473,339 B1 | 6/2013 | McKennon et al. | |
| 8,478,780 B2 | 7/2013 | Cooper et al. | |
| 8,484,228 B2 | 7/2013 | Bhattacharyya et al. | |
| 8,631,006 B1 | 1/2014 | Haveliwala et al. | |
| 8,645,298 B2 | 2/2014 | Hennig et al. | |
| 8,660,849 B2 | 2/2014 | Gruber et al. | |
| 8,732,222 B2 | 5/2014 | Horvitz et al. | |
| 8,805,734 B2 | 8/2014 | Diana et al. | |
| 8,817,968 B1 | 8/2014 | Boutcher et al. | |
| 8,850,490 B1 | 9/2014 | Thomas et al. | |
| 8,892,539 B2 | 11/2014 | Anand et al. | |
| 8,909,568 B1 | 12/2014 | Mann et al. | |
| 8,935,192 B1 | 1/2015 | Ventilla et al. | |
| 8,943,145 B1 | 1/2015 | Peters et al. | |
| 8,983,977 B2 | 3/2015 | Ishikawa et al. | |
| 9,015,031 B2 | 4/2015 | Ferrucci et al. | |
| 9,037,578 B2 | 5/2015 | Brust et al. | |
| 9,060,062 B1 | 6/2015 | Madahar et al. | |
| 9,063,983 B1 | 6/2015 | Lee | |
| 9,229,974 B1 | 1/2016 | Lee et al. | |
| 9,235,626 B2 | 1/2016 | Liu et al. | |
| 9,247,066 B1 | 1/2016 | Stec et al. | |
| 9,336,211 B1 | 5/2016 | Bousquet et al. | |
| 9,336,269 B1 | 5/2016 | Smith et al. | |
| 9,342,608 B2 | 5/2016 | Cook et al. | |
| 9,460,191 B1 | 10/2016 | Gaucher et al. | |
| 9,471,883 B2 | 10/2016 | Chatterjee et al. | |
| 9,582,757 B1 | 2/2017 | Holmes et al. | |
| 9,633,309 B2 | 4/2017 | Giffels et al. | |
| 9,767,169 B1 | 9/2017 | Paff et al. | |
| 9,779,388 B1 | 10/2017 | Hansen et al. | |
| 9,887,887 B2 | 2/2018 | Hunter et al. | |
| 9,892,367 B2 | 2/2018 | Guo et al. | |
| 9,910,886 B2 | 3/2018 | Adams, Jr. et al. | |
| 10,002,177 B1 | 6/2018 | McClintock et al. | |
| 10,049,664 B1 | 8/2018 | Indyk et al. | |
| 10,083,213 B1 | 9/2018 | Podgorny et al. | |
| 10,134,050 B1 | 11/2018 | Hung et al. | |
| 10,147,037 B1 | 12/2018 | Podgorny et al. | |
| 10,162,734 B1 | 12/2018 | Podgorny et al. | |
| 10,210,244 B1 | 2/2019 | Branavan et al. | |
| 10,354,182 B2 | 7/2019 | Chang et al. | |
| 10,460,398 B1 | 10/2019 | Gielow et al. | |
| 10,475,044 B1 | 11/2019 | Cannon et al. | |
| 10,522,134 B1 | 12/2019 | Matsoukas | |
| 10,552,843 B1 | 2/2020 | Podgorny et al. | |
| 10,579,625 B2 | 3/2020 | Cho et al. | |
| 2002/0087387 A1 | 7/2002 | Calver et al. | |
| 2002/0111888 A1 | 8/2002 | Stanley et al. | |
| 2002/0111926 A1 | 8/2002 | Bebie | |
| 2002/0123983 A1 | 9/2002 | Riley et al. | |
| 2002/0169595 A1 | 11/2002 | Agichtein et al. | |
| 2003/0028448 A1 | 2/2003 | Joseph et al. | |
| 2003/0061131 A1 | 3/2003 | Parkan | |
| 2003/0099924 A1 | 5/2003 | Tsuboi et al. | |
| 2003/0101161 A1 | 5/2003 | Ferguson et al. | |
| 2003/0144873 A1 | 7/2003 | Keshel | |
| 2004/0024739 A1 | 2/2004 | Copperman et al. | |
| 2004/0064442 A1 | 4/2004 | Popovitch | |
| 2005/0086290 A1 | 4/2005 | Joyce et al. | |
| 2005/0114327 A1 | 5/2005 | Kumamoto et al. | |
| 2005/0137939 A1 | 6/2005 | Calabria et al. | |
| 2005/0246314 A1 | 11/2005 | Eder | |
| 2006/0064322 A1 | 3/2006 | Mascarenhas et al. | |
| 2006/0074788 A1 | 4/2006 | Grizack et al. | |
| 2006/0085255 A1 | 4/2006 | Hastings et al. | |
| 2006/0085750 A1 | 4/2006 | Easton et al. | |
| 2006/0253578 A1 | 11/2006 | Dixon et al. | |
| 2006/0265232 A1 | 11/2006 | Katariya et al. | |
| 2007/0011131 A1 | 1/2007 | Delefevre | |
| 2007/0192166 A1 | 8/2007 | Van Luchene | |
| 2007/0192168 A1 | 8/2007 | Van Luchene | |
| 2007/0192179 A1 | 8/2007 | Van Luchene | |
| 2007/0219863 A1 | 9/2007 | Park et al. | |
| 2007/0244900 A1 | 10/2007 | Hopkins et al. | |
| 2007/0259325 A1 | 11/2007 | Clapper | |
| 2007/0291739 A1 | 12/2007 | Sullivan et al. | |
| 2007/0294195 A1 | 12/2007 | Curry et al. | |
| 2008/0189197 A1 | 8/2008 | Allanson et al. | |
| 2008/0201413 A1 | 8/2008 | Sullivan et al. | |
| 2008/0208610 A1 | 8/2008 | Thomas et al. | |
| 2008/0214151 A1 | 9/2008 | Ramer et al. | |
| 2008/0215541 A1 | 9/2008 | Li et al. | |
| 2008/0248815 A1 | 10/2008 | Busch | |
| 2008/0294637 A1 | 11/2008 | Liu | |
| 2009/0012926 A1 | 1/2009 | Ishikawa et al. | |
| 2009/0077047 A1 | 3/2009 | Cooper et al. | |
| 2009/0089286 A1 | 4/2009 | Kumar et al. | |
| 2009/0119575 A1 | 5/2009 | Velusamy | |
| 2009/0158143 A1 | 6/2009 | Arav | |
| 2009/0162824 A1 | 6/2009 | Heck | |
| 2009/0198667 A1 | 8/2009 | Groeneveld et al. | |
| 2009/0248659 A1 | 10/2009 | McCool et al. | |
| 2009/0253112 A1 | 10/2009 | Cao et al. | |
| 2009/0259642 A1 | 10/2009 | Cao et al. | |
| 2009/0265340 A1 | 10/2009 | Barcklay et al. | |
| 2009/0292609 A1 | 11/2009 | Vaidyanathan | |
| 2010/0068687 A1 | 3/2010 | Bertelsen | |
| 2010/0070554 A1 | 3/2010 | Richardson et al. | |
| 2010/0076847 A1 | 3/2010 | Heller | |
| 2010/0076998 A1 | 3/2010 | Podgorny et al. | |
| 2010/0088262 A1 * | 4/2010 | Visel | G06N 3/02 706/18 |
| 2010/0138451 A1 | 6/2010 | Henkin et al. | |
| 2010/0185630 A1 | 7/2010 | Cheng et al. | |
| 2010/0191686 A1 | 7/2010 | Wang et al. | |
| 2010/0203492 A1 | 8/2010 | Nibe et al. | |
| 2010/0205180 A1 | 8/2010 | Cooper et al. | |
| 2010/0205550 A1 | 8/2010 | Chen et al. | |
| 2010/0228744 A1 | 9/2010 | Craswell et al. | |
| 2010/0235361 A1 | 9/2010 | Chandran et al. | |
| 2010/0241507 A1 | 9/2010 | Quinn et al. | |
| 2010/0241971 A1 | 9/2010 | Zuber | |
| 2010/0318919 A1 | 12/2010 | Murphy et al. | |
| 2011/0055110 A1 | 3/2011 | Kolyvanov et al. | |
| 2011/0055699 A1 | 3/2011 | Li et al. | |
| 2011/0071997 A1 | 3/2011 | Sullivan et al. | |
| 2011/0106895 A1 | 5/2011 | Ventilla et al. | |
| 2011/0125734 A1 | 5/2011 | Duboue et al. | |
| 2011/0202472 A1 | 8/2011 | Wan et al. | |
| 2011/0231347 A1 | 9/2011 | Xu et al. | |

(56) References Cited

U.S. PATENT DOCUMENTS

| | | |
|---|---|---|
| 2011/0246334 A1 | 10/2011 | Schoenberg et al. |
| 2011/0264569 A1 | 10/2011 | Houseworth et al. |
| 2011/0282892 A1 | 11/2011 | Castellani et al. |
| 2011/0295612 A1 | 12/2011 | Donneau-Golencer et al. |
| 2012/0005148 A1 | 1/2012 | Horvitz et al. |
| 2012/0005219 A1 | 1/2012 | Apacible et al. |
| 2012/0022983 A1 | 1/2012 | Hughes et al. |
| 2012/0030079 A1 | 2/2012 | Slater et al. |
| 2012/0077178 A1 | 3/2012 | Bagchi et al. |
| 2012/0084120 A1 | 4/2012 | Hirsch et al. |
| 2012/0084185 A1 | 4/2012 | Ciaramitaro et al. |
| 2012/0084279 A1 | 4/2012 | Driscoll et al. |
| 2012/0084293 A1 | 4/2012 | Brown et al. |
| 2012/0095976 A1 | 4/2012 | Hebenthal et al. |
| 2012/0101965 A1 | 4/2012 | Hennig et al. |
| 2012/0130910 A1 | 5/2012 | Al-Alami |
| 2012/0130978 A1 | 5/2012 | Li et al. |
| 2012/0136764 A1 | 5/2012 | Miller et al. |
| 2012/0150861 A1 | 6/2012 | Thione et al. |
| 2012/0166438 A1 | 6/2012 | Wu et al. |
| 2012/0219142 A1 | 8/2012 | Gould |
| 2012/0221557 A1 | 8/2012 | Edmonds et al. |
| 2012/0233191 A1 | 9/2012 | Ramanujam |
| 2012/0331052 A1 | 12/2012 | Rathod |
| 2013/0019286 A1 | 1/2013 | Barborak et al. |
| 2013/0024290 A1 | 1/2013 | Berg et al. |
| 2013/0054497 A1 | 2/2013 | Garland et al. |
| 2013/0066693 A1 | 3/2013 | Laird-McConnell et al. |
| 2013/0073387 A1 | 3/2013 | Heath |
| 2013/0073390 A1 | 3/2013 | Konig et al. |
| 2013/0103493 A1 | 4/2013 | Gao et al. |
| 2013/0110671 A1 | 5/2013 | Gray |
| 2013/0110823 A1 | 5/2013 | Su et al. |
| 2013/0111323 A1 | 5/2013 | Taghaddos et al. |
| 2013/0117677 A1 | 5/2013 | St. Jacques, Jr. |
| 2013/0204876 A1 | 8/2013 | Szucs et al. |
| 2013/0224713 A1 | 8/2013 | Ajmera et al. |
| 2013/0268319 A1 | 10/2013 | Palombo |
| 2013/0275408 A1 | 10/2013 | Rodriguez et al. |
| 2013/0282363 A1 | 10/2013 | Fan et al. |
| 2013/0285855 A1 | 10/2013 | Dupray et al. |
| 2013/0297545 A1 | 11/2013 | Bierner et al. |
| 2013/0297553 A1* | 11/2013 | Bierner ............... G06N 20/00 706/52 |
| 2013/0297625 A1 | 11/2013 | Bierner et al. |
| 2013/0304730 A1 | 11/2013 | Zhou |
| 2013/0325992 A1 | 12/2013 | McGann et al. |
| 2013/0339870 A1 | 12/2013 | Tandra Sishtla et al. |
| 2014/0006012 A1* | 1/2014 | Zhou ............... G06F 16/3344 704/9 |
| 2014/0022328 A1 | 1/2014 | Gechter et al. |
| 2014/0052496 A1 | 2/2014 | Diana et al. |
| 2014/0052606 A1 | 2/2014 | Vasudevan et al. |
| 2014/0075004 A1 | 3/2014 | Van Dusen et al. |
| 2014/0088944 A1 | 3/2014 | Natarajan et al. |
| 2014/0114822 A1 | 4/2014 | Sharma et al. |
| 2014/0119531 A1 | 5/2014 | Tuchman et al. |
| 2014/0172883 A1* | 6/2014 | Clark ............... G06N 5/022 707/749 |
| 2014/0181652 A1 | 6/2014 | Stanke et al. |
| 2014/0189829 A1 | 7/2014 | McLachlan et al. |
| 2014/0195613 A1 | 7/2014 | Ogilvie |
| 2014/0201045 A1 | 7/2014 | Pai et al. |
| 2014/0222669 A1 | 8/2014 | Novak et al. |
| 2014/0244528 A1 | 8/2014 | Zhang et al. |
| 2014/0280055 A1 | 9/2014 | Chang et al. |
| 2014/0280070 A1 | 9/2014 | George et al. |
| 2014/0308648 A1 | 10/2014 | Jain |
| 2014/0316856 A1 | 10/2014 | Williams et al. |
| 2014/0324856 A1 | 10/2014 | Lahiani et al. |
| 2014/0337257 A1 | 11/2014 | Chatterjee et al. |
| 2014/0372980 A1 | 12/2014 | Verma et al. |
| 2015/0006344 A1 | 1/2015 | Saimani et al. |
| 2015/0052087 A1 | 2/2015 | Srinivasan et al. |
| 2015/0058380 A1 | 2/2015 | Polonsky et al. |
| 2015/0088608 A1 | 3/2015 | Cama et al. |
| 2015/0095267 A1 | 4/2015 | Behere et al. |
| 2015/0120718 A1 | 4/2015 | Luo et al. |
| 2015/0127587 A1 | 5/2015 | Pinckney et al. |
| 2015/0139415 A1 | 5/2015 | Skiba et al. |
| 2015/0170049 A1 | 6/2015 | Mann et al. |
| 2015/0213021 A1 | 7/2015 | He et al. |
| 2015/0229531 A1 | 8/2015 | O'Sullivan et al. |
| 2015/0242906 A1 | 8/2015 | Liu et al. |
| 2015/0254785 A1 | 9/2015 | Yang et al. |
| 2015/0317197 A1 | 11/2015 | Blair |
| 2015/0324367 A1 | 11/2015 | Aravamudan et al. |
| 2015/0324805 A1* | 11/2015 | Skiba ............... G06Q 50/01 705/7.13 |
| 2015/0363481 A1 | 12/2015 | Haynes |
| 2015/0371137 A1 | 12/2015 | Giffels et al. |
| 2016/0048772 A1 | 2/2016 | Bruno et al. |
| 2016/0055234 A1 | 2/2016 | Visotski et al. |
| 2016/0062980 A1* | 3/2016 | Boguraev ............... G06N 5/04 706/11 |
| 2016/0078567 A1 | 3/2016 | Goldman et al. |
| 2016/0103833 A1 | 4/2016 | Sanders et al. |
| 2016/0147760 A1 | 5/2016 | N et al. |
| 2016/0148222 A1 | 5/2016 | Davar et al. |
| 2016/0148321 A1 | 5/2016 | Ciaramitaro et al. |
| 2016/0154856 A1 | 6/2016 | Olof-Ors et al. |
| 2016/0179816 A1 | 6/2016 | Glover |
| 2016/0180470 A1 | 6/2016 | Mascaro et al. |
| 2016/0189029 A1 | 6/2016 | Giffels et al. |
| 2016/0196497 A1 | 7/2016 | Allen et al. |
| 2016/0203523 A1 | 7/2016 | Spasojevic et al. |
| 2016/0217472 A1 | 7/2016 | Podgorny et al. |
| 2016/0247165 A1 | 8/2016 | Ryabchun et al. |
| 2016/0283491 A1 | 9/2016 | Lu et al. |
| 2016/0306846 A1 | 10/2016 | Adams, Jr. et al. |
| 2016/0371276 A1 | 12/2016 | Furtado et al. |
| 2017/0011352 A1 | 1/2017 | Jones-McFadden et al. |
| 2017/0024424 A1 | 1/2017 | Almohizea |
| 2017/0032251 A1 | 2/2017 | Podgorny et al. |
| 2017/0032468 A1 | 2/2017 | Wang et al. |
| 2017/0046623 A1 | 2/2017 | Murdock et al. |
| 2017/0053026 A1 | 2/2017 | Musuluri et al. |
| 2017/0124184 A1 | 5/2017 | Podgorny et al. |
| 2017/0213130 A1 | 7/2017 | Khatri et al. |
| 2017/0228459 A1 | 8/2017 | Wang et al. |
| 2017/0262529 A1 | 9/2017 | Chim et al. |
| 2017/0262900 A1 | 9/2017 | Ramachandran et al. |
| 2017/0270159 A1 | 9/2017 | Wang et al. |
| 2017/0308613 A1 | 10/2017 | Zhu et al. |
| 2017/0323233 A1 | 11/2017 | Bencke et al. |
| 2018/0032523 A1 | 2/2018 | Singhal et al. |
| 2018/0032607 A1 | 2/2018 | Singhal et al. |
| 2018/0032890 A1 | 2/2018 | Podgorny et al. |
| 2018/0089283 A1 | 3/2018 | Indyk et al. |
| 2018/0108092 A1 | 4/2018 | Goodyear et al. |
| 2018/0108093 A1 | 4/2018 | Podgorny et al. |
| 2018/0113935 A1 | 4/2018 | George et al. |
| 2018/0137203 A1 | 5/2018 | Hennekey et al. |
| 2018/0189292 A1 | 7/2018 | Grace, Jr. et al. |
| 2018/0196796 A1 | 7/2018 | Wu |
| 2018/0204106 A1 | 7/2018 | Beller et al. |
| 2018/0287968 A1 | 10/2018 | Koukoumidis et al. |
| 2018/0321951 A1 | 11/2018 | Fitzgerald et al. |
| 2019/0018692 A1 | 1/2019 | Lndyk et al. |
| 2019/0018899 A1 | 1/2019 | Podgorny et al. |
| 2019/0065576 A1 | 2/2019 | Peng et al. |
| 2019/0103035 A1 | 4/2019 | Beller et al. |
| 2020/0134635 A1 | 4/2020 | Podgorny et al. |
| 2020/0134738 A1 | 4/2020 | Goodyear et al. |

FOREIGN PATENT DOCUMENTS

| | | |
|---|---|---|
| EP | 2159715 | 3/2010 |
| JP | 2014112316 | 6/2014 |

(56) References Cited

FOREIGN PATENT DOCUMENTS

| WO | 2001082202 A2 | 11/2001 |
|---|---|---|
| WO | WO 2011/053830 | 5/2011 |

OTHER PUBLICATIONS

Han et al., "Understanding and Supporting Cross-Device Web Search for Exploratory Tasks with Mobile Touch Interactions," Apr. 2015, ACM Transactions on Information System, vol. 33, No. 4, pp. 1-35, (Year: 2015).

Kumar et al., "Personalized Web search Using Browsing History and Domain Knowledge" International Conference on Issues and Challenges in Intelligent Computing Techniques (ICICT), IEEE 2014, pp. 493-497.

Wen et al., "Clustering user Queries of a Search Engine," Proceedings of the 10th International Conference on World Wide Web, pp. 162-168, ACM, 2001 (Year: 2001).

Blei, David M., et al. "Latent Dirichlet Allocation;" Journal of Machine Learning Research 3, Jan. 2003, pp. 993-1022.

Steyvers, Mark, et al. "Probabilistic Author-Topic Models for Information Discovery;" KDD'04, Aug. 22-25, 2004.

The Scientific Marketer, "Uplift Modelling FAQ", article date of Sep. 27, 2007, retrieved from http://scientificmarketer.com/2007/09/uplift-modelling-faq.html (Year: 2007).

Mimno, David, et al., "Sparse Stochastic Inference for Latent Dirichlet Allocation," Proceedings of the 29th International Conference on Machine Learning, Edinburgh, Scotland, UK, 2012.

Zadeh, Z.; "Probabilistic Modeling in Community-Based Question Answering Services," Dalhousie University, Halifax, Nova Scotia; Feb. 2012.

Blei, David M., "Probabilistic Topic Models," Communications of the ACM, Apr. 2012, vol. 55, No. 4, pp. 77-84.

Grant, Sheryl, et al., "The Human Face of Crowdsourcing: A Citizen-led Crowdsourcing Case Study;" 2013 IEEE International Conference on Big Data, Silicon Valley, CA, 2013, pp. 21-24.

Dror, et al., "From Query to Question in One Click: Suggesting Synthetic Questions to Searchers," International World Wide Web Conferences Steering Committee, May 13, 2013, pp. 391-401.

Podgorny, et al., "Content Quality and User Ranking in TurboTax AnswerXchange," Proceedings of the European Conference on Social Media, University of Brighton UK, Jul. 10-11, 2014.

Podgorny, et al. "Real Time Detection and Intervention of Poorly Phrased Questions," CHI EA '15, Proceedings of the $33^{rd}$ Annual ACM Conference Extended Abstracts on Human Factors in Computing Systems, Apr. 18-23, 2015, Seoul, Republic of Korea, pp. 2205-2210.

Encyclopedia Britannica, "Graphical User Interface (GUI);" Sep. 5, 2015. Retrieved from the internet <URL: https://www.britannica.com/technology/graphical-user-interface>.

Bartolome et al., "Processing Unstructured Voice of Customer Feedback for Improving Content Rankings in Customer Support Systems," U.S. Appl. No. 15/094,653, filed Apr. 8, 2016.

Wikipedia, "Widget (GUI)," Sep. 7, 2016. Retrieved from the internet <URL: https://en.wikipedia.org/w/index.php?title=Widget_(GUI)&oldid=738206274>.

Get Satisfaction [online]. Sprinklr, 2017 [retrieved on Nov. 22, 2017]. Retrieved from the Internet: <URL: https://getsatisfaction.com/corp>.

* cited by examiner

| TYPE/FORMAT OF QUESTION | OCCURRENCE PERCENTAGE (%) | SATISFIED WITH ANSWER (%) |
|---|---|---|
| CLOSED-ENDED (Yes/No or Multiple choice) | 28.1 | 85.9 |
| WHO (Person) | 1.6 | 81.4 |
| WHAT (Thing or object) | 9.7 | 73.1 |
| WHERE (Position or place) | 8.6 | 70.2 |
| WHEN (Time or occasion) | 5.5 | 68.2 |
| ILL-FORMED (Search Query) | 28.7 | 66.8 |
| HOW (Way or form) | 21.6 | 66.4 |
| WHY (Reason or explanation) | 7.5 | 56.3 |

FIG. 1A

| MODEL ATTRIBUTE | WALD CHI-SQUARE |
|---|---|
| "CLOSED-ENDED" TYPE | (+) 339 |
| "WHY" TYPE | (−) 317 |
| REPORTING A PROBLEM | (−) 180 |
| "HOW" TYPE | (−) 105 |
| INTENT TO CALL/CHAT | (−) 104 |
| SUBJECT LENGTH | (+) 87 |
| SOFTWARE RELATED | (−) 77 |
| PERSONAL PRONOUN "YOU" | (−) 75 |
| INTENT TO PRINT TAX RETURN | (−) 66 |
| QUESTION MARK IN QUESTION | (+) 59 |

FIG. 1C

Asker Engagement Model Attributes

Information Gains for the acknowledgment classifier top model attributes.

| Attribute | Gain | Acknowledgment |
| --- | --- | --- |
| Type 1: Answered > 1 week | 0.0232 | Down |
| Type 1: Answered < 15 minutes | 0.0163 | Up |
| Type 2: Question subject length | 0.0072 | Up |
| Type 3: Answered by superuser | 0.0069 | Up |
| Type 2: Proper subject capitalization | 0.0067 | Up |
| Type 2: Question mark in subject | 0.0060 | Up |
| Type 3: Answered by employee | 0.0046 | Down |
| Type 4: Premier or HBiz SKU | 0.0031 | Up |
| Type 2: Closed-ended question | 0.0030 | Up |
| Type 4: Free SKU | 0.0019 | Down |

FIG. 2A

METHOD AND SYSTEM FOR QUESTION PRIORITIZATION BASED ON ANALYSIS OF THE QUESTION CONTENT AND PREDICTED ASKER ENGAGEMENT BEFORE ANSWER CONTENT IS GENERATED

RELATED APPLICATION

This application is a division of Cannon et al., U.S. patent application Ser. No. 14/812,066, filed on Jul. 29, 2015, entitled, "METHOD AND SYSTEM FOR QUESTION PRIORITIZATION BASED ON ANALYSIS OF THE QUESTION CONTENT AND PREDICTED ASKER ENGAGEMENT BEFORE ANSWER CONTENT IS GENERATED," now U.S. Pat. No. 10,475,044, which is herein incorporated by reference in its entirety as if it were fully set forth herein.

BACKGROUND

Software applications and systems have become indispensable tools for helping consumers, i.e., users, perform a wide variety of tasks in their daily professional and personal lives. Currently, numerous types of desktop, web-based, and cloud-based software systems are available to help users perform a plethora of tasks ranging from basic computing system operations and word processing, to financial management, small business management, tax preparation, health tracking and healthcare management, as well as other personal and business endeavors, operations, and functions far too numerous to individually delineate here.

One major, if not determinative, factor in the utility, and ultimate commercial success, of a given software system of any type is the ability to implement and provide a customer support system through which a given user can obtain assistance and, in particular, get answers to questions that arise during the installation and operation of the software system. However, providing potentially millions of software system users specialized advice and answers to their specific questions is a huge undertaking that can easily, and rapidly, become economically infeasible.

To address this problem, many providers of software systems implement or sponsor one or more question and answer based customer support systems. Typically, a question and answer based customer support system includes a hosted forum through which an asking user can direct their specific questions, typically in a text format, to a support community that often includes other users and/or professional agent support personnel.

In many cases, once an asking user's specific question is answered by members of the support community through the question and answer based customer support system, the asking user's specific question, and the answer to the specific question provided by the support community, is categorized and added to a customer support question and answer database associated with the question and answer based customer support system. In this way, subsequent searching users, i.e., a user accessing previously generated question and answer pairs, of the software system can access the asking users' specific questions or topics, and find the answer to the asking users' questions, via a search of the customer support question and answer database. As a result, a dynamic customer support question and answer database of categorized/indexed asking users questions and answers is made available to searching users of the software system through the question and answer based customer support system.

The development of customer support question and answer databases has numerous advantages including a self-help element whereby a searching user can find an answer to their particular question by simply searching the customer support question and answer database for topics, questions, and answers related to their issue previously submitted by asking users. Consequently, using a question and answer based customer support system including a customer support question and answer database, potentially millions of user questions can be answered in an efficient and effective manner, and with minimal duplicative effort.

Using currently available question and answer based customer support systems, once an asking user's question is answered, the asking user is provided the opportunity to rate the answer with respect to how helpful the answer was to the asking user. In addition, searching users in the user community are provided the opportunity to rate accessed question and answer pair content based on how helpful the answer was to them. In this way, feedback is provided with respect to a given question and answer pair, and answers with low satisfaction ratings, i.e., poorly rated answers, can eventually be identified by this feedback. In addition, this feedback data is also often used to determine/rank which question and answer pair, or pairs, to provide a searching user in response to question content submitted by the searching user.

Using traditional customer support question and answer databases, when a searching user submits a question, e.g., submits question data, to the customer support question and answer database, the customer support question and answer database is searched to determine if the question currently being asked has been answered before. Typically, if a determination is made that the question currently being asked, or a sufficiently similar question, has been answered before, the searching user is then provided one or more answers previously provided to the previously submitted questions determined to be the same as, or sufficiently similar to, the question currently being asked. Typically the searching user is then provided results data representing one or more previously asked question and answer pairs.

Using traditional customer support question and answer databases, the determination as to which previously answered question and answer pair, or pairs, are most likely to result in the searching user being satisfied with the answer provided is made largely, if not entirely, based on the feedback data, or ranking data, associated with the previously answered question and answer pair data provided by the original asking user and/or subsequent searching users as discussed above. As a result, using current question and answer based customer support systems, and their associated customer support question and answer databases, poorly rated, or low quality/value question and answer pair data is only removed reactively, after it has potentially been viewed by multiple users, and often a large number of searching users, if there is a significant delay between generating answer data and obtaining feedback regarding the question and answer pair data, especially from the original asking user. Consequently, using traditional customer support question and answer databases, it is imperative that feedback data, or ranking data, be obtained as quickly as possible, especially from the original asking user.

In addition, the determination as to which previously answered question and answer pair, or pairs, are most likely to result in the searching user being satisfied with the answer can only be made reactively after feedback data, or ranking data, associated with the previously answered question and answer pair data is provided by the original asking user and/or subsequent searching users. This is particularly problematic because until feedback data, or ranking data, regarding previously answered question and answer pair data is received from a significant number of users, the determination as to which previously answered question and answer pair, or pairs, are most likely to result in the searching user being satisfied with the answer can only be made on, at best, likely skewed and inaccurate data. Consequently, using traditional customer support question and answer databases, it is again imperative that feedback data, or ranking data, be obtained as quickly as possible, especially from the original asking user.

A related problem for providers of question and answer based customer support systems is the situation where an asking user submits question data to the question and answer based customer support system representing the asking user's question and then never returns to the question and answer based customer support system to check for, and/or review, answers to the submitted question, or in any way further engage the question and answer based customer support system. This is a problematic situation not only because precious support resources are wasted on an asker user who never again engages the question and answer based customer support system, but also because the non-engaging asking user never provides any feedback to the question and answer based customer support system, the support community, or other users. Consequently, these non-engaging asking users are a significant drain on customer support resources associated with the question and answer based customer support system.

The above situation presents several challenges to the providers of question and answer based customer support systems, and their associated customer support question and answer databases. These challenges are partially significant given that a customer support question and answer database is usually a critical, if not the most important, feature of a question and answer based customer support system. This is because there is, by definition, a finite number of support resources, such as, for example, support personnel, either volunteers or professionals, and, therefore, there is a limit to the amount of support resources, such as support person-hours, available at any time to answer user questions. Consequently, it is important to utilize support resources, such as a support community, efficiently not only to answer questions in a reasonable timeframe, but to answer questions that are likely to result in engaged and satisfied asking users first, as opposed to questions submitted by non-engaging asking users who, once their question is submitted, never reengage with the question and answer based customer support system to even check for, and/or read, answers to their question, much less participate in the question and answer based customer support system by leaving feedback, review, or ratings data.

As noted above, to most efficiently utilize support resources, such as volunteer and professional agent support personnel of a support community, it is desirable to focus those support resources on questions submitted by asking users who are likely to engage the question and answer based customer support system after their questions are submitted, read the answer(s) to their submitted questions, and, ideally, rate and/or review the question answer data, and/or the question and answer based customer support system and support community. In this way, the use of the support resources will yield more positive results and a customer support question and answer database will be developed, and/or dynamically adapted, to provide higher quality answer content predicted to provide a greater number of users with answer content meeting their needs.

Despite this long standing need, traditional question and answer based customer support systems typically do not address the issue discussed above. This is largely because, using traditional question and answer based customer support systems, analysis of question and answer data is largely preformed reactively only after the answer data has been generated, and after the support resources, such as volunteer and professional agent support personnel of a support community, have been devoted to answering the question. Consequently, using traditional question and answer based customer support systems, precious support resources are often devoted to questions submitted by asking users who are not likely to engage the question and answer based customer support system after their questions are submitted, read the answer to their submitted questions, or rate and/or review the question answers and/or the question and answer based customer support system.

In addition, to make matters worse, it is often the case that much more precious support resources are wasted trying to answer questions submitted by asking users who are not likely to engage the question and answer based customer support system after their questions are submitted than those asking users who are likely to engage the question and answer based customer support system after their questions are submitted. This is because, unfortunately, questions submitted by asking users who are not likely to engage the question and answer based customer support system are often low quality questions in a low quality question format.

Clearly, the situation described above represents a significant issue and a long standing problem for question and answer based customer support systems and software system providers. This is because user satisfaction with the question and answer based customer support systems is not only critical to the effectiveness of the question and answer based customer support systems, but also to the satisfaction and reputation of the software system and the software system provider. As a result of the situation described above, currently, both users and providers of software systems, and question and answer based customer support systems of all types, are denied the full potential of the question and answer based customer support systems. Consequently, the technical fields of information dissemination, customer support, feedback utilization and integration, software implementation and operation, and user experience are detrimentally affected.

What is needed is a method and system for reliably, efficiently, and proactively predicting an asking user's post question submission engagement with a question and answer based customer support system before any significant support resources were devoted to answering the asking user's question. In this way, questions submitted by asking users determined to have a low asking user engagement probability, i.e., asking users that are not likely to engage the question and answer based customer support system after the question is submitted, could be given a low priority, or could even be ignored, while questions submitted by asking users determined to have a high asking user engagement probability, i.e., asking users that are likely to engage the question and answer based customer support system after the question is submitted, could be given a high priority. In this way, support resources, such as the time and energy of support personnel, could utilized most efficiently.

SUMMARY

Embodiments of the present disclosure address some of the shortcomings associated with traditional question and answer based customer support systems by focusing initial analysis on the question being asked by the user before routing the question to support resources, such as, but not limited to, proper support personnel, and before any specific answer data is generated, or provided to any users. In this way, the question itself is analyzed and questions determined to be low engagement probability questions submitted by asking users that have a low probability of further engagement with the question and answer based customer support system, i.e., that are not likely to return to check for an answer to their question, are provided to the support resources, such as, but not limited to, proper support personnel, on a low priority basis. Likewise, in one embodiment, the question itself is analyzed and questions determined to be high engagement probability questions submitted by asking users that have a high probability of further engagement with the question and answer based customer support system, i.e., that are likely to return to check for an answer to their question, are provided to the support resources, such as, but not limited to, proper support personnel, on a high priority basis.

In one embodiment, a method and system for allocating support resources to a question based on analysis of the question content and predicted asker engagement before the answer content is generated includes providing a software system to one or more users. In one embodiment, users of the software system are provided a question and answer based customer support system through which question data can be entered by the users representing questions to potentially be provided to one or more support resources associated with the question and answer based customer support system so that the questions represented by the question data can be answered via answer data generated using the support resources.

In accordance with one embodiment, low asking user engagement probability predictors are defined that, when present, indicate a low probability of asking user engagement once the asking user has submitted question data representing the asking user's question. In one embodiment, questions represented by question data that include one or more low asking user engagement probability predictors are defined as low engagement probability questions.

In accordance with one embodiment, question data is received representing a question submitted by an asking user through the question and answer based customer support system. In one embodiment, before allocating support resources to generating answer data related to the question data, the question data is analyzed to determine if the question data includes one or more low asking user engagement probability predictors and therefore represents a low engagement probability question.

In accordance with one embodiment, if, based on the analysis of the question data, a determination is made that the question data represents a low engagement probability question, support resources are allocated to generating answer data related to the question data on a low priority basis.

In one embodiment, a method and system for allocating support resources to a question based on analysis of the question content and predicted asker engagement before the answer content is generated includes providing a software system to one or more users. In one embodiment, users of the software system are provided a question and answer based customer support system through which question data can be entered by the users representing questions to potentially be provided to one or more support resources associated with the question and answer based customer support system so that the questions represented by the question data can be answered via answer data generated using the support resources.

In accordance with one embodiment, high asking user engagement probability predictors are defined that, when present, indicate a high probability of asking user engagement once the asking user has submitted question data representing the asking user's question. In one embodiment, questions represented by question data that include one or more high asking user engagement probability predictors are defined as high engagement probability questions.

In accordance with one embodiment, question data is received representing a question submitted by an asking user through the question and answer based customer support system. In one embodiment, before allocating support resources to generating answer data related to the question data, the question data is analyzed to determine if the question data includes one or more high asking user engagement probability predictors and therefore represents a high engagement probability question.

In accordance with one embodiment, if, based on the analysis of the question data, a determination is made that the question data represents a high engagement probability question, support resources are allocated to generating answer data related to the question data on a high priority basis.

In one embodiment, the method and system for allocating support resources to a question based on analysis of the question content and predicted asker engagement before the answer content is generated includes performing pre-question submission parsing of the question data and analysis of the attributes, subject matter, and format of the question itself, to determine what type of resources should be devoted to the question based on defined low and/or high asking user engagement probability predictors; all before any support resources are devoted to the question and before answer data is generated or provided to any user. This paradigm shifting approach to allocating support resources based on analysis of the user's question alone using defined low and/or high asking user engagement probability predictors, before routing the question and/or allocating support resources to the question, and before the answer is generated, is in direct contrast to prior art assumptions and approaches that focused entirely on analysis of the answer data provided after both the question and answer had already been formulated, and support resources were utilized in an attempt to answer the question.

As noted above, a customer support question and answer database is a critical, if not the most important, feature of a question and answer based customer support system. This is because there is, by definition, a finite number of support resources, such as, for example, support personal, either volunteers or professionals, and, therefore, there is a limit to the amount of support resources, such as support person-hours, available at any time to answer user questions. Consequently, it is important to utilize support resources, such as a support community, efficiently.

Using the concepts disclosed herein, asking user engagement with a question and answer based customer support system, e.g., the asking user's interaction with question and answer based customer support system after the asking user submits their question, is predicted using defined low and/or high asking user engagement probability predictors before any significant support resources are allocated to answering the question. Therefore, using the concepts disclosed herein, methods and systems are provided to reliably, efficiently, and proactively determine an asking user's predicted engagement with the question and answer based customer support system and then efficiently and effectively allocate support resources, such as volunteer and/or professional agent support personnel of a support community, accordingly. In this way, support resources are not wasted on non-engaging users.

The disclosed embodiments do not encompass, embody, or preclude other forms of innovation in the area of customer support and question and answer based customer support systems. In addition, the disclosed embodiments are not related to any fundamental economic practice and, in fact, are directed to the relatively new technical area of electronic data and Internet based customer support systems and software system support. Consequently, the disclosed embodiments are not directed to, do not encompass, and are not merely abstract ideas or concepts.

The disclosed method and system for allocating support resources to a question based on analysis of the question content and predicted asker engagement before the answer content is generated provides for significant improvements to the technical fields of customer support, information dissemination, software implementation, and user experience. In addition, using the disclosed method and system for allocating support resources to a question based on analysis of the question content and predicted asker engagement before the answer content is generated results in more efficient use of human and non-human resources, fewer processor cycles being utilized, reduced memory utilization, and less communications bandwidth being utilized to relay data to and from backend systems. As a result, computing systems are transformed into faster, more efficient, and more effective computing systems by implementing the method and system for allocating support resources to a question based on analysis of the question content and predicted asker engagement before the answer content is generated disclosed herein.

BRIEF DESCRIPTION OF THE DRAWINGS

FIG. 1A shows a table of results data obtained through analysis of actual questions submitted to a question and answer based customer support system indicating question types, the frequency of the question types as a percentage of questions asked, and ranking of the question types by up vote fraction;

FIG. 1C is a table of results data obtained through analysis of actual questions submitted to a question and answer based customer support system showing the Wald Chi-square statistics for the top subject attributes of a user vote prediction model;

FIG. 2A is a table of asker engagement model attributes in accordance with one embodiment;

Figure 1B:
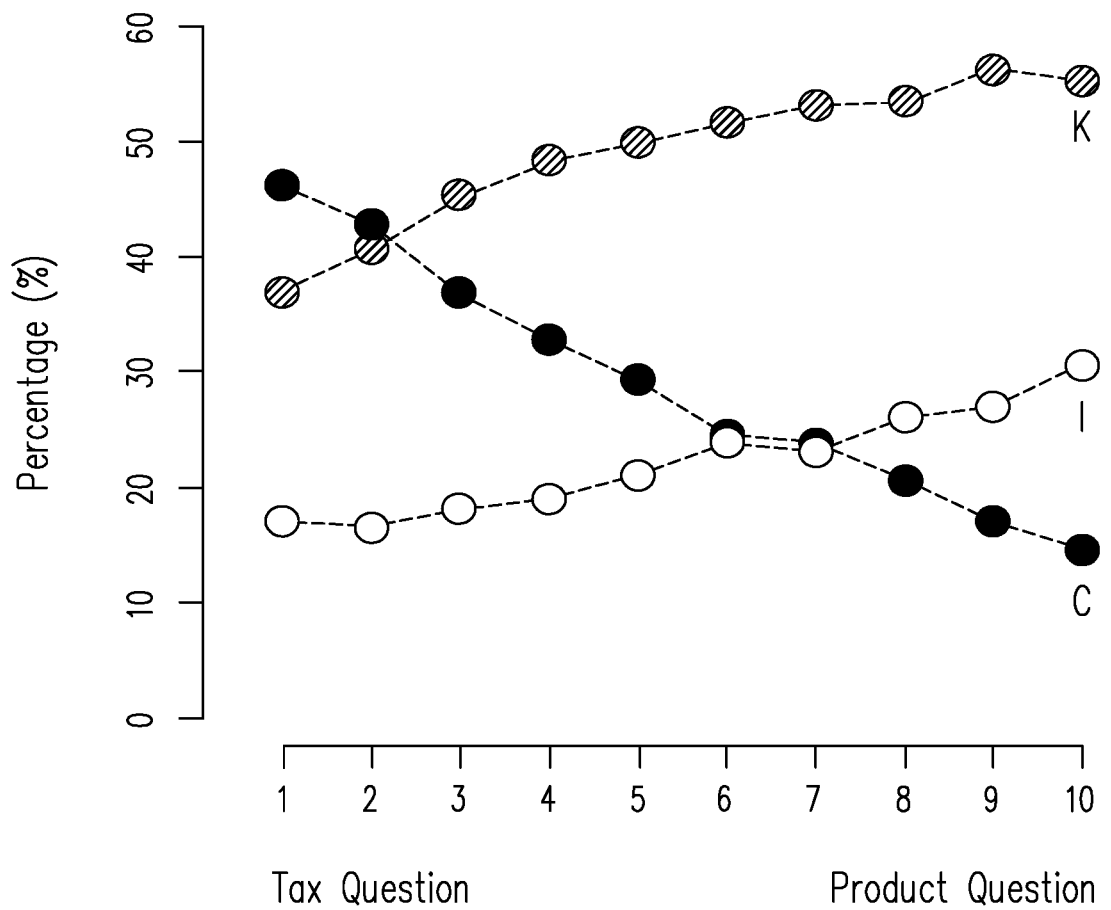
FIG. 1B is a graph of results data obtained through analysis of actual questions submitted to a question and answer based customer support system showing the discovered relationship between "subject matter questions," "product related questions," and the category of question asked.

Common reference numerals are used throughout the FIG.s and the detailed description to indicate like elements. One skilled in the art will readily recognize that the above FIG.s are examples and that other architectures, modes of operation, orders of operation, and elements/functions can be provided and implemented without departing from the characteristics and features of the invention, as set forth in the claims.

Term Definitions

Herein, a software system can be, but is not limited to, any data management system implemented on a computing system, accessed through one or more servers, accessed through a network, accessed through a cloud, and/or provided through any system or by any means, as discussed herein, and/or as known in the art at the time of filing, and/or as developed after the time of filing, that gathers/obtains data, from one or more sources and/or has the capability to analyze at least part of the data.

As used herein, the term software system includes, but is not limited to the following: computing system implemented, and/or online, and/or web-based, personal and/or business tax preparation systems; computing system implemented, and/or online, and/or web-based, personal and/or business financial management systems, services, packages, programs, modules, or applications; computing system implemented, and/or online, and/or web-based, personal and/or business management systems, services, packages, programs, modules, or applications; computing system implemented, and/or online, and/or web-based, personal and/or business accounting and/or invoicing systems, services, packages, programs, modules, or applications; and various other personal and/or business electronic data management systems, services, packages, programs, modules, or applications, whether known at the time of filling or as developed later.

Specific examples of software systems include, but are not limited to the following: TurboTax™ available from Intuit, Inc. of Mountain View, Calif.; TurboTax Online™ available from Intuit, Inc. of Mountain View, Calif.; Quicken™, available from Intuit, Inc. of Mountain View, Calif.; Quicken Online™, available from Intuit, Inc. of Mountain View, Calif.; QuickBooks™, available from Intuit, Inc. of Mountain View, Calif.; QuickBooks Online™, available from Intuit, Inc. of Mountain View, Calif.; Mint™, available from Intuit, Inc. of Mountain View, Calif.; Mint Online™, available from Intuit, Inc. of Mountain View, Calif.; and/or various other software systems discussed herein, and/or known to those of skill in the art at the time of filing, and/or as developed after the time of filing.

As used herein, the terms "computing system," "computing device," and "computing entity," include, but are not limited to, the following: a server computing system; a workstation; a desktop computing system; a mobile computing system, including, but not limited to, smart phones, portable devices, and/or devices worn or carried by a user; a database system or storage cluster; a virtual asset; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms "computing system" and "computing entity," can denote, but are not limited to the following: systems made up of multiple virtual assets, server computing systems, workstations, desktop computing systems, mobile computing systems, database systems or storage clusters, switching systems, routers, hardware systems, communications systems, proxy systems, gateway systems, firewall systems, load balancing systems, or any devices that can be used to perform the processes and/or operations as described herein.

Herein, the terms "mobile computing system" and "mobile device" are used interchangeably and include, but are not limited to the following: a smart phone; a cellular phone; a digital wireless telephone; a tablet computing system; a notebook computing system; any portable computing system; a two-way pager; a Personal Digital Assistant (PDA); a media player; an Internet appliance; devices worn or carried by a user; or any other movable/mobile device and/or computing system that includes components that can execute all, or part, of any one of the processes and/or operations as described herein.

Herein, the term "production environment" includes the various components, or assets, used to deploy, implement, access, and use, a given software system as that software system is intended to be used. In various embodiments, production environments include multiple computing systems and/or assets that are combined, communicatively coupled, virtually and/or physically connected, and/or associated with one another, to provide the production environment implementing the application.

As specific illustrative examples, the assets making up a given production environment can include, but are not limited to, the following: one or more computing environments used to implement at least part of the software system in the production environment such as a data center, a cloud computing environment, a dedicated hosting environment, and/or one or more other computing environments in which one or more assets used by the application in the production environment are implemented; one or more computing systems or computing entities used to implement at least part of the software system in the production environment; one or more virtual assets used to implement at least part of the software system in the production environment; one or more supervisory or control systems, such as hypervisors, or other monitoring and management systems used to monitor and control assets and/or components of the production environment; one or more communications channels for sending and receiving data used to implement at least part of the software system in the production environment; one or more access control systems for limiting access to various components of the production environment, such as firewalls and gateways; one or more traffic and/or routing systems used to direct, control, and/or buffer data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement at least part of the software system in the production environment; one or more databases used to store data in the production environment; one or more internal or external services used to implement at least part of the software system in the production environment; one or more backend systems, such as backend servers or other hardware used to process data and implement at least part of the software system in the production environment; one or more software modules/functions used to implement at least part of the software system in the production environment; and/or any other assets/components making up an actual production environment in which at least part of the software system is deployed, implemented, accessed, and run, e.g., operated, as discussed herein, and/or as known in the art at the time of filing, and/or as developed after the time of filing.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known, "trusted" environments or unknown, "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate at least part of the software system.

In various embodiments, one or more cloud computing environments are used to create, and/or deploy, and/or operate at least part of the software system that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given software system or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, the following: virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing can be implemented as one or more virtual assets.

In one embodiment, two or more assets, such as computing systems and/or virtual assets, and/or two or more computing environments are connected by one or more communications channels including but not limited to, Secure Sockets Layer (SSL) communications channels and various other secure communications channels, and/or distributed computing system networks, such as, but not limited to the following: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, the following: a peer-to-peer network; a hybrid peer-to-peer network; a Local Area Network (LAN); a Wide Area Network (WAN); a public network, such as the Internet; a private network; a cellular network; any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

Herein, the term "party," "user," "user consumer," and "customer" are used interchangeably to denote any party and/or entity that interfaces with, and/or to whom information is provided by, the method and system for allocating support resources to a question based on analysis of the question content and predicted asker engagement before the answer content is generated described herein, and/or a person and/or entity that interfaces with, and/or to whom information is provided by, the method and system for allocating support resources to a question based on analysis of the question content and predicted asker engagement before the answer content is generated described herein, and/or a legal guardian of person and/or entity that interfaces with, and/or to whom information is provided by, the method and system for allocating support resources to a question based on analysis of the question content and predicted asker engagement before the answer content is generated described herein, and/or an authorized agent of any party and/or person and/or entity that interfaces with, and/or to whom information is provided by, the method and system for allocating support resources to a question based on analysis of the question content and predicted asker engagement before the answer content is generated described herein. For instance, in various embodiments, a user can be, but is not limited to, a person, a commercial entity, an application, a service, and/or a computing system.

As used herein, the term "asking user" includes a user of a software system submitting a question to a question and answer based customer support system.

As used herein, the term "searching user" includes a user of a software system submitting a search query to a customer support question and answer database associated with a question and answer based customer support system.

As used herein, the term "support community for the software system" includes unpaid users, paid agents, or other support personnel who operate through software system and that are used as support resources for generating answer data associated with user submitted question data.

As used herein, the term "volunteer support personnel of a support community for the software system" includes unpaid users or other support personnel who operate through a support community for the software system and that are used as support resources for generating answer data associated with user submitted question data. As a specific example, volunteer support personnel of a support community for the software system include "super users" and other volunteer support personnel certified by a provider of a software system and/or a question and answer based customer support system associated with a software system. As an even more specific illustrative example, in some instances, volunteer support personnel of a support community for the software system are subject matter experts best utilized to answer questions directed to the subject matter and area of endeavor of the software system.

As used herein, the term "professional agent support personnel of a support community for the software system" includes paid agents or other support personnel who operate through a support community for the software system and that are used as support resources for generating answer data associated with user submitted question data. As a specific example, professional agent support personnel of a support community for the software system include paid customer support personnel in the employment of, or otherwise associated with, a provider of a software system and/or a question and answer based customer support system associated with a software system. As an even more specific illustrative example, in some instances, professional agent support personnel of a support community for the software system are product installation, operation, and sales experts best utilized to answer product type questions directed to the installation, general operation, and sales of the software system.

Theory and Empirical Analysis

The embodiments disclosed herein were developed to incorporate theories and address relationships discovered through analysis of data collected from a specific question and answer based customer support system implemented by Intuit™ Inc. of Mountain View, Calif. The specific question and answer based customer support system through which the data was collected was the TurboTax™ AnswerXchange™ (AXC) question and answer based customer support system.

AXC is a social question and answer based customer support system providing support for TurboTax™ customers and also serving as a discussion forum in the area of US Federal and State taxation. AXC is also used to generate reusable content for TurboTax™ user searches, i.e., to create a customer support question and answer database for TurboTax™ users. In fact, only 1.5% of AXC users are asking users who actually submit questions, while the remaining searching users look for answers by searching a customer support question and answer database provided through AXC.

AXC includes a support community of customer support personnel. In one embodiment, questions submitted to AXC are answered by members of the support community of customer support personnel. In one embodiment, the customer support personnel include paid professional agent support personnel in the employ of Intuit™ and volunteer support personnel who are often non-paid, expert users of the TurboTax™ software system. In one embodiment, the volunteer support personnel of the TurboTax™ software system are identified and certified by Intuit™.

Questions submitted to AXC are formulated in a variety of ways and directed to various broad categories. As one example, some questions were product related questions, e.g., questions related to pricing, installation, version choice, etc. of the TurboTax™ software system that often had little or no relation to the subject matter/endeavor supported by the TurboTax™ software system, i.e., tax preparation. On the other hand, some questions were subject matter related, or substantive questions, directly related to the subject matter/endeavor supported by the TurboTax™ software system, i.e., Federal and State taxation and tax preparation.

As an example, the questions "What version of Turbo-Tax™ should I use?" or "How do I install TurboTax™?" would be product related questions, while the questions "Can I deduct my computer?" or "What is my adjusted gross income?" would be subject matter related questions. As discussed below, it was empirically determined that, in general, product related questions are best answered by paid professional agent support personnel in the employ of Intuit™ while subject matter related questions are often best answered by volunteer support personnel, e.g., volunteer expert users.

Similar to other question and answer based customer support systems, AXC measures the quality of content, and answer content in particular, by collecting statistics of up and down votes directed to answer content provided by the asking users and searching users where an up vote indicates user satisfaction with the answer to the question and a down vote indicates user dissatisfaction with the answer to the question.

At the same time, the AXC questions were not ranked or judged based on quality of content beyond user satisfaction ratings, unless the question was determined as inappropriate and blocked from AXC. Therefore, user satisfaction with answer content in AXC typically would be derived from user votes alone thus providing a useful metric for answer quality. For example, this approach was applied to predicting answer satisfaction in AXC based on the one or more attributes of the question and answer combined with one or more AXC users' attributes. On the other hand, as disclosed herein, a recent analysis of AXC vote statistics found that answer quality/satisfaction is largely predetermined by the question subject matter, and/or type/format, and that users' satisfaction votes can be predicted with reasonable accuracy based on the attributes of the question alone.

This finding provided a practical framework for "proactive" detection of low-quality content at the question submission stage, i.e. before the question is even answered, and is the foundation of the disclosed embodiments of methods and systems for allocating support resources to a question based on analysis of the question content and predicted asker engagement before the answer content is generated. This is because a strong relationship was discovered by the Inventors between detection of low-quality content at the question submission stage and asking user engagement. That is to say, it was discovered by the Inventors that low-quality content at the question submission stage is a low asking user engagement probability predictor and high-quality content at the question submission stage is a high asking user engagement probability predictor. It is believed this discovered correlation reflects the thought and care that an asking user puts into a question submission, and that is indicative of the asking user's future engagement with the question and answer based customer support system. In short, if the asking user takes the time to submit high-quality content at the question submission stage, it is more likely the asking user will return to the question and answer based customer support system to check for/review answer data, and leave reviews and feedback. Similarly, if the asking user does not take the time to submit high-quality content at the question submission stage, i.e., submits low-quality content at the question submission stage, it is less likely the asking user will return to the question and answer based customer support system to check for/review answer data, and leave reviews and feedback.

As noted above, questions submitted to AXC are formulated in a variety of ways and directed to various broad categories and subjects and in various question formats representing various question types. As one example, one user may ask "What version of TurboTax should I use?" Another user may ask "How do I install TurboTax?" Yet another user may ask "Can I deduct my computer?" It was determined that the optimal AXC design must be based on an empiric question taxonomy taking into account one or more of, the question category, the question format, the question grammar structure, the type of anticipated answer, asker type, and various other factors.

The Inventors began with general knowledge/open-ended question taxonomy. Specifically, the Inventors looked for "Wh- word" and "How" questions including interrogative pronouns such as "Who", "What", "When", "Where", "Why" and "How" used to compose general knowledge/open-ended category questions.

FIG. 1A is a table of results data obtained through the analysis of actual questions submitted to AXC. The table of FIG. 1A shows question types, also referred to herein as formats (column 101) of the 2014 AXC questions received, the frequency of the question types as a percentage of questions asked (column 102), and ranking of the question types/formats by up vote fraction (column 103) that are shown in FIG. 1A in the descending order. It is noted that the sum of up vote and down vote fractions can be equal to greater than 100% because some questions may belong to more than one type. As seen in FIG. 1A, when "Wh- words" analysis was applied to the AXC question subjects with question summaries limited to 255 characters, 54.5% of the questions received fell into the general knowledge/open-ended category.

One of the Inventors' goals was to separate question types/formats by the observed statistics relating up and down votes associated with the answers provided to each question types/formats. The result of this analysis is shown in FIG. 1A. Referring to FIG. 1A, note that "Why" formatted questions can often indicate mildly negative sentiment and often imply a rhetorical question, e.g., "Why is this so difficult?" or "Why is this taking so much time?" The Inventors postulate that this explains the lowest up vote fraction of 56.3% being associated with the "Why" question type/format in the general knowledge/open-ended category, as shown in FIG. 1A.

Next, the Inventors selected closed-ended category questions from the 56.8% of AXC questions that did not belong to the general knowledge/open-ended category. Most of the closed-ended type/format questions in AXC were in the sub-category of "Yes/No" type/format questions. These "Yes/No" type/format questions typically start with an auxiliary verb such as "Do", "Can", "Be." As indicated by the name, the "Yes/No" type/format questions can be answered by a "Yes" or "No" answer. A specific illustrative example of a "Yes/No" question would be: "Can I deduct my computer?" with the possible answers "Yes, you can" or "No, you can't."

The second sub-category of closed-ended question type/format includes "Choice" type/format questions. "Choice" type/format questions generally start with an auxiliary verb as well, but also contain the conjunction "or." Consequently, "Choice" type/format questions usually result in a multiple choice answer embedded in the body of the question. A specific illustrative example of a "Choice" type/format question would be "Should I install X or Y version?" with the possible answers "You need to install Y," "You need to install X," "You need to install either X or Y," "You need to install neither X or Y."

As seen in FIG. 1A, closed-ended type/format questions resulted in an impressive 85.9% up vote, i.e., 85.9% of users who submitted questions in the closed-ended format were satisfied with the answer provided. As seen in FIG. 1A, this was the highest satisfaction rating of all question types/formats. The high fraction of the up votes for the answers to the closed-ended type/format questions of in FIG. 1A is not surprising. Closed-ended type/format questions were typically long enough to provide sufficient context for answering, and were more likely to be subject matter related questions, as opposed to product related questions. As discussed below, subject matter related questions were channeled to volunteer support personnel, e.g., volunteer expert users, for answering and had a higher predicted likelihood of resulting in an up vote (see FIG. 1B discussed below).

Finally, if a question submitted to AXC was deemed to be neither a general knowledge/open-ended nor a closed-ended type/format question, the question was classified as being in the ill-formed question category by default. Most of the ill-formed category questions did not follow a grammatically correct question format either intentionally, e.g., search query type, or unintentionally, e.g., improper grammar, punctuation, etc., and were more difficult to answer. This, of course resulted in a higher probability of down vote from the users.

"How" and "Why" question types/formats were detectable with regular expressions analysis. Similarly "When", "Where" and "who" question types/formats were detectable with regular expressions analysis but the analysis was slightly more involved as it typically required part-of-speech tagging to avoid confusion with relative adverbs and relative pronouns. However, as seen in FIG. 1A, these question types/formats were less common in AXC. More exotic question types/formats, such as "tag questions," "leading questions," and "embedded questions," were determined to be extremely rare in AXC and therefore were largely excluded from the Inventors' analysis.

FIG. 1B is a graph of results data obtained through analysis of actual questions submitted to AXC and showing the discovered relationship between: the percentage of up votes indicating user satisfaction with the answer provided (vertical axis), the category of question, e.g., "subject matter questions", or in the case of AXC, tax questions; "product related questions," or in the case of AXC TurboTax™ product questions; and the type/format of the question asked. The horizontal axis in FIG. 1B was divided into Deciles 1 to 10, with Decile 1 corresponding to well-defined subject matter related questions, and Decile 10 corresponding to well-defined product related questions. Consequently, FIG. 1B displays the satisfaction percentages of general knowledge/open-ended (K), closed-ended (C), and ill-formed questions types versus content type. In the Inventors' analysis, only voted upon, and therefore answered, questions were used to ensure the results reported/displayed in FIG. 1B that were consistent with the results reported/displayed in FIG. 1A.

FIG. 1C is a table of results data obtained through analysis of actual questions submitted to AXC showing the Wald Chi-square statistics for the top subject attributes of an AXC user vote prediction model. In FIG. 1C, the (+) and (−) signs indicate positive or negative correlation between attribute and up vote. As seen in FIG. 1C, closed-ended, "Why" and "How" question types are three out of the four most important model attributes. The third attribute, "Reporting a problem," was found to correlate with "Why" and "How" types. As noted above, "Why" questions are often rhetorical and may remain "unanswerable" unless the user provides further details.

As noted above, the initial analysis discussed above revealed that answer quality/satisfaction is largely predetermined by the question subject matter, and/or type/format, and that users' satisfaction votes can be predicted with reasonable accuracy based on the attributes of the question alone.

This finding provided a practical framework for "proactive" detection of low-quality content at the question submission stage, i.e. before the question is even answered, and is the foundation of the disclosed embodiments of methods and systems for allocating support resources to a question based on analysis of the question content and predicted asker engagement before the answer content is generated. This is because a strong relationship was discovered by the Inventors between detection of low-quality content, i.e., poor question formatting, at the question submission stage and asking user engagement. That is to say, it was discovered by the Inventors that low-quality content and poor question formatting at the question submission stage is a low asking user engagement probability predictor and high-quality content and proper question formatting at the question submission stage is a high asking user engagement probability predictor.

As also noted above, it is believed this discovered correlation reflects the thought and care that an asking user puts into a question submission, and that is indicative of the asking user's future engagement with the question and answer based customer support system. In short, if the asking user takes the time to submit high-quality content in a proper question format at the question submission stage, it is more likely the asking user will return to the question and answer based customer support system to check for/review answer data, and leave reviews and feedback. Similarly, if the asking user does not take the time to submit high-quality content in a proper question format at the question submission stage, i.e., submits low-quality content in an improper question format at the question submission stage, it is less likely the asking user will return to the question and answer based customer support system to check for/review answer data, and leave reviews and feedback.

As discussed in more detail below, in addition to an improper question format, several other low asking user engagement probability predictors were also discovered by the inventors including, but not limited to: a question length less than a defined threshold question length; a question subject length less than a defined threshold question subject length; the absence of a question mark at the end of the question; improper, or absent, punctuation in the question data; the asking user being associated with a free version of the software system; the asking user being a new user of the software system; the asking user using the software system for a time period less than a defined threshold time period; and the predicted time to answer the question represented by the question data being greater than a defined threshold time.

As discussed in more detail below, in addition to proper question format, several other high asking user engagement probability predictors were also discovered by the inventors including, but not limited to: a question length greater than a defined threshold question length; a question subject length greater than a defined threshold question subject length; the presence of a question mark at the end of the question data; proper punctuation in the question data; a proper question format; the asking user being associated with a paid version of the software system; the asking user being a known user of the software system; the asking user using the software system for a time period greater than a defined threshold time period; and the predicted time to answer the question represented by the question data being less than a defined threshold time.

In the initial analysis performed by the Inventors, the low asking user engagement probability predictors and high asking user engagement probability predictors were grouped into predictor types. Referring to FIG. 2A an illustrative table of some of these user engagement probability predictor types and the individual user engagement probability predictors is shown.

In FIG. 2A, the individual user engagement probability predictors are listed according to the gain associated with each user engagement probability predictor, e.g., how significant the individual user engagement probability predictors was to the analysis and the effect on the acknowledgement, e.g., post answer engagement, by the asking user.

Figure 2B:
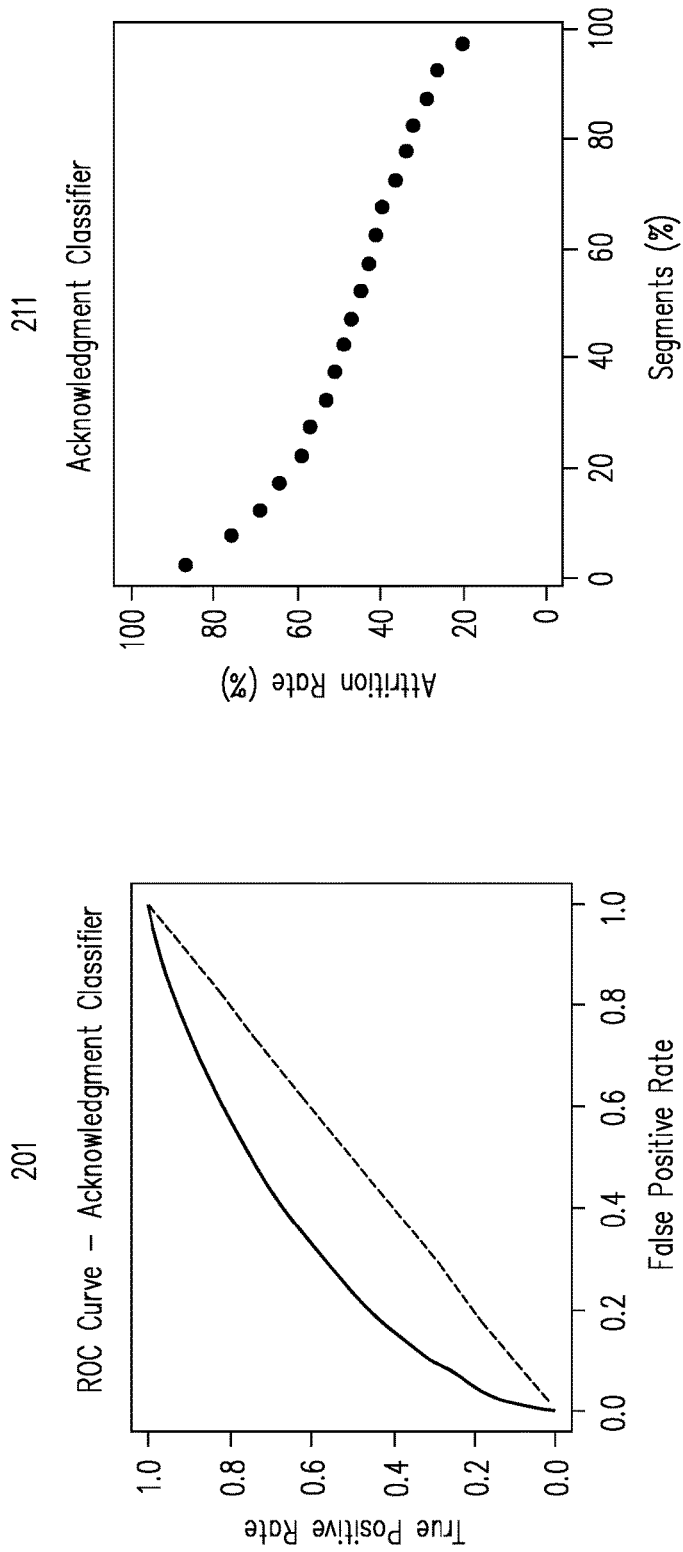
FIG. 2B includes an ROC curve for an asker engagement classifier used to predict asker engagement associated with one embodiment and a graph of results data obtained through analysis of actual questions submitted to a question and answer based customer support system showing a discovered relationship between "attrition rate," assigned "segments;"

FIG. 2B shows a Receiver Operating Characteristic (ROC) curve 201 for the asker engagement classifier used to predict asker engagement during research associated with one embodiment. FIG. 2B also shows an acknowledgement classifier graph 211 showing results data obtained through analysis of actual questions submitted to a question and answer based customer support system showing the discovered relationship between "attrition rate," and 20 "segments" assigned by the predicted asking engagement rate. In acknowledgement classifier graph 211, the attrition rate shown on the vertical axis is calculated as 100% minus the acknowledgement rate.

Consequently, the Inventors discovered that asking user engagement can be accurately predicted by analyzing the attributes of the question data submitted alone.

DETAILED DISCLOSURE

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In one embodiment a software system is provided. As noted above, herein, the term software system includes, but is not limited to the following: computing system implemented, and/or online, and/or web-based, personal and/or business tax preparation systems; computing system implemented, and/or online, and/or web-based, personal and/or business financial management systems, services, packages, programs, modules, or applications; computing system implemented, and/or online, and/or web-based, personal and/or business management systems, services, packages, programs, modules, or applications; computing system implemented, and/or online, and/or web-based, personal and/or business accounting and/or invoicing systems, services, packages, programs, modules, or applications; and various other personal and/or business electronic data management systems, services, packages, programs, modules, or applications, whether known at the time of filling or as developed later.

Specific examples of software systems include, but are not limited to the following: TurboTax™ available from Intuit, Inc. of Mountain View, Calif.; TurboTax Online™ available from Intuit, Inc. of Mountain View, Calif.; Quicken™, available from Intuit, Inc. of Mountain View, Calif.; Quicken Online™, available from Intuit, Inc. of Mountain View, Calif.; QuickBooks™, available from Intuit, Inc. of Mountain View, Calif.; QuickBooks Online™, available from Intuit, Inc. of Mountain View, Calif.; Mint™, available from Intuit, Inc. of Mountain View, Calif.; Mint Online™, available from Intuit, Inc. of Mountain View, Calif.; and/or various other software systems discussed herein, and/or known to those of skill in the art at the time of filing, and/or as developed after the time of filing.

In one embodiment a question and answer based customer support system, e.g., a social question and answer (Q&A) system, is provided to support users of the software system.

In one embodiment, the question and answer based customer support system serves as a discussion forum in an area of endeavor related to the software system. As an illustrative example, in one embodiment, the question and answer based customer support system is provided to support a tax preparation software system and therefore the discussion forum is related to "federal and state taxation and tax preparation."

In one embodiment, users of the software system are provided the capability to submit product type questions regarding the installation, implementation, use and operation of the software system, as well as subject matter type questions, through the question and answer based customer support system.

In one embodiment, the question and answer based customer support system includes one or more support resources which the users of the software system can access through the question and answer based customer support system. In various embodiments, the support resources include but are not limited to, phone-type support resources, chat-type support resources, text-based support resources, audio-based support resources, video-based support resources, support community-based support resources, and/or any support resources, or combination of support resources, as discussed herein, and/or as known/available in the art at the time of filing, and/or as developed/made available after the time of filing.

In one embodiment, the support resources are accessed by users to obtain answers, in the form of answer data, to questions submitted by the users in the form of question data to, or through, the question and answer based customer support system.

In one embodiment, the support resources include a support community of customer support personnel. In one embodiment, the customer support personnel include paid professional agent support personnel that are in the employ of the provider of the software system and non-paid volunteer support personnel, e.g., volunteer expert users, of the software system. In one embodiment, the volunteer support personnel of the software system are identified and certified by the provider of the software system.

In one embodiment, through the question and answer based customer support system, users of the software system are provided the capability to submit questions to members of the support community of customer support personnel in the form of submitted question data.

In one embodiment, questions submitted to the question and answer based customer support system can be related to very different broad categories, be of various question types, and be formatted in various different ways. For example, some questions submitted to the question and answer based customer support system are product related questions, e.g., questions related to pricing, installation, version choice, etc. for the software systems that often have little or no relation to the subject matter/job of the software system, i.e., the endeavor supported by the software system. On the other hand, some questions submitted to the question and answer based customer support system are subject matter related, or substantive, questions directly related to the subject matter/endeavor of the software system.

As an illustrative example, in the case of a tax preparation software system, the questions "What version of the tax preparation software system should I use?" or "How do I install the tax preparation software system?" would be product related questions, while the questions "Can I deduct my computer?" or "What is my adjusted gross income?" would be subject matter related questions.

In one embodiment, the question and answer based customer support system is used to generate reusable content for the question and answer based customer support system, e.g., the question and answer based customer support system is used to generate a customer support question and answer database. In one embodiment, the creation of the customer support question and answer database is the primary goal of the question and answer based customer support system.

In accordance with one embodiment, low asking user engagement probability predictors are defined that, when present, indicate a low probability of asking user engagement once the asking user has submitted question data representing the asking user's question.

In various embodiments, the low asking user engagement probability predictors discovered by the inventors include, but are not limited to: improper question format; a question length less than a defined threshold question length; a question subject length less than a defined threshold question subject length; the absence of a question mark at the end of the question; improper, or absent, punctuation in the question data; the asking user being associated with a free version of the software system; the asking user being a new user of the software system; the asking user using the software system for a time period less than a defined threshold time period; and the predicted time to answer the question represented by the question data being greater than a defined threshold time.

As noted above, the low asking user engagement probability predictors include, but are not limited to, an improper question format low asking user engagement probability predictor. As noted above, questions submitted to the question and answer based customer support system can be structured/formatted in a variety of ways and these various question type/formats can vary significantly in quality, and more importantly, in the predicted user satisfaction with an answer, any answer, to the question.

As a specific illustrative example, questions submitted to the question and answer based customer support system can be, but are not limited to: general knowledge/open-ended type questions, defined as "Who" type/format questions, "What" type/format questions, "When" type/format questions, "Where" type/format questions, "Why" type/format questions, and "How" type/format questions; rhetorical, or otherwise "unanswerable" questions; grammatically incorrect questions and/or queries; otherwise ill-formed questions; and/or closed-ended questions, capable of being answered with a simple "yes" or "no", or via a multi-choice, or mapping.

In one embodiment, each of these question structures is associated with a empirically calculated predictability that the answer to the question, whatever that answer may be, will be found satisfactory by the users, e.g., the asking user and/or searching users. As also discussed herein, this finding provided a practical framework for the disclosed embodiments of methods and systems for allocating support resources to a question based on analysis of the question content and predicted asker engagement before the answer content is generated. This is because a strong relationship was discovered by the Inventors between question quality content and question formatting at the question submission stage and asking user engagement. That is to say, it was discovered by the Inventors that low-quality content and/or an improper question format at the question submission stage is a low asking user engagement probability predictor indicating the asking user is not likely to reengage the question and answer based customer support system once the question data has been submitted, even to simply check for, and/or review answer data, much less to leave review or rating data. Likewise, it was discovered that high-quality content, and/or proper question format, at the question submission stage is a high asking user engagement probability predictor indicating the asking user is likely to reengage the question and answer based customer support system once the question data has been submitted.

It is believed this discovered correlation reflects the thought and care that an asking user puts into a question submission and is therefore indicative of the asking user's future engagement with the question and answer based customer support system. In short, if the asking user takes the time to submit high-quality content in the proper format at the question submission stage, it is more likely the asking user will return to the question and answer based customer support system to check for/review answer data, and leave reviews and feedback. Similarly, if the asking user does not take the time to submit high-quality content in the proper format at the question submission stage, i.e., submits low-quality content in an improper format at the question submission stage, it is less likely the asking user will return to the question and answer based customer support system to check for/review answer data, and leave reviews and feedback.

Consequently, in one embodiment, the low asking user engagement probability predictors include, but are not limited to, an improper question format low asking user engagement probability predictor.

In one embodiment, general knowledge/open-ended category questions submitted are identified. General knowledge/open-ended category questions are of the form "Who," "What," "Where," "When," "How," and "Why" formatted questions. Consequently, in one embodiment, the question data is analyzed to detect these terms, or their functional equivalents.

In one embodiment, "How" and "Why" question formats are detectable using format analysis instructions that implement regular expressions analysis. Similarly "When", "Where" and "Who" question types are detectable using format analysis instructions that implement regular expressions analysis, however, the analysis is slightly more involved as it typically requires part-of-speech tagging to avoid confusion with relative adverbs and relative pronouns.

In one embodiment, question data representing general knowledge/open-ended category questions are considered to be in an improper question format and therefore, as discussed below, are determined to be low engagement probability questions.

In one embodiment, closed-ended category questions submitted are identified. In general, closed-ended question formats are detectable using format analysis instructions that implement regular expressions analysis.

In one embodiment, closed-ended category questions are identified/defined. Most closed-ended formatted questions are placed in the sub-category of "Yes/No" type questions. These "Yes/No" type questions typically start with an auxiliary verb such as "Do", "Can", "Be." As indicated by the name, the "Yes/No" type questions can be answered by a "Yes" or "No" answer. A specific illustrative example of a "Yes/No" question would be: "Can I deduct my computer?" with the possible answers "Yes, you can" or "No, you can't."

The second sub-category of closed-ended question format includes "Choice" type questions. "Choice" type questions generally start with an auxiliary verb as well, but also contain the conjunction "or." Consequently, "Choice" type questions usually result in a multiple choice answer embedded in the body of the question. A specific illustrative example of a "Choice" type question would be "Should I install X or Y version?" with the possible answers "You need to install Y," "You need to install X," "You need to install either X or Y," "You need to install neither X or Y."

As seen in FIG. 1A, closed-ended questions result in an impressive 85.9% up vote, i.e., 85.9% of users who submit questions in the closed-ended format are satisfied with the answer provided. As also seen in FIG. 1A this is the highest satisfaction rating of all question formats. Consequently, question data representing questions in a closed-ended format are considered to be in a proper question format and therefore, as discussed below, are determined to be high engagement probability questions.

In one embodiment, if a question submitted to the question and answer based customer support system is deemed to be neither a general knowledge/open-ended nor a closed-ended format question, the question is classified as being in the ill-formed question category by default. Most of the ill-formed category questions do not follow a grammatically correct question format either intentionally, as in the case of a search query type, or unintentionally, e.g., wrong grammar, punctuation, etc. In one embodiment, question data representing questions in the ill-formed question category are considered to be in an improper question format and therefore, as discussed below, are determined to be low engagement probability questions.

In one embodiment, low quality question formats, and therefore, as discussed below, low engagement probability questions, are defined/identified based on the empirical data obtained as discussed above and shown in FIG. 1A.

As noted above, the low asking user engagement probability predictors include a question length less than a defined threshold question length low asking user engagement probability predictor. Using this low asking user engagement probability predictor, the length of the question, i.e., the amount of question data submitted is analyzed and compared to a defined threshold question length. In one embodiment, the threshold question length is defined based on a determination of question length that is indicative of the required level of effort having been put forth by the asking user. In this case, the theory is that if the asking user does not put forth enough effort to generate question data representing a question of at least the defined length, then the asking user is determined to be less likely to reengage the question and answer based customer support system once the question data has been submitted. In short, using this low asking user engagement probability predictor, if the asking user does not put forth enough effort to submit a question of at least a minimum threshold length, then it is predicted that the asking user will not put forth the effort to reengage with the question and answer based customer support system, and/or leave review, feedback, or rating data. Consequently, the length of the question submitted is a low asking user engagement probability predictor.

As noted above, the low asking user engagement probability predictors include, but are not limited to, a question subject length less than a defined threshold question subject length low asking user engagement probability predictor. Using this low asking user engagement probability predictor the length of the question subject, i.e., the amount of question subject or header data submitted, is analyzed and compared to a defined threshold question subject length. In one embodiment, the threshold question subject length is defined based on a determination of question subject length that is indicative of the required level of effort having been put forth by the asking user. In this case, the theory is that if the asking user does not put forth enough effort to generate question subject data representing a question subject of the defined length, then the asking user is determined to be less likely to reengage the question and answer based customer support system once the question data has been submitted, and/or leave review, feedback, or rating data. In short, using this low asking user engagement probability predictor, if the asking user does not put forth enough effort to submit a question subject of at least a minimum threshold length, then it is predicted that the asking user will not put forth the effort to reengage with the question and answer based customer support system, and/or leave review, feedback, or rating data. Consequently, the length of the question subject submitted is a low asking user engagement probability predictor.

As noted above, the low asking user engagement probability predictors include, but are not limited to, the absence of a question mark at the end of the question low asking user engagement probability predictor. The theory behind this low asking user engagement probability predictor is that if the asking user does not take the time, or pay attention to detail enough, to place a question mark at the end of the question represented by the question data, is unlikely the asking user will take the time or energy to reengage the question answer based customer support system once the question data submitted, and/or leave review, feedback, or rating data. Consequently, in one embodiment, the absence of a question mark at the end of the question is a low asking user engagement probability predictor.

As noted above, the low asking user engagement probability predictors include, but are not limited to, improper, or absent, punctuation in the question data low asking user engagement probability predictor. The theory behind this low asking user engagement probability predictor is that if the asking user does not take the time, or pay attention to detail enough, to use proper punctuation in the question represented by the question data, is unlikely the asking user will take the time or energy to reengage the question answer based customer support system once the question data submitted, and/or leave review, feedback, or rating data. Consequently, in one embodiment, improper, or absent, punctuation in the question data is a low asking user engagement probability predictor.

As noted above, the low asking user engagement probability predictors include, but are not limited to, the asking user being associated with a free version of the software system low asking user engagement probability predictor. The theory behind this low asking user engagement probability predictor is that, as determined empirically, an asking user utilizing a free version of the parent software system is less likely to reengage with the question and answer based customer support system, and/or leave review, feedback, or rating data, than an asking user utilizing a version of the parent software system to the asking user has paid for. Consequently, in one embodiment, the asking user being associated with a free version of the software system is a low asking user engagement probability predictor.

As noted above, the low asking user engagement probability predictors include, but are not limited to, the asking user being a new user of the software system low asking user engagement probability predictor. The theory behind this low asking user engagement probability predictor is that a user who is using the parent software system on a trial basis, and/or for the first time, is less likely to reengage with a question and answer based customer support system, and/or leave review, feedback, or rating data, than an asking user who has been using the software system for a defined period of time. Consequently, in one embodiment, the asking user being a new user of the software system is a low asking user engagement probability predictor.

As noted above, the low asking user engagement probability predictors include, but are not limited to, the asking user using the software system for a time period less than a defined threshold time period low asking user engagement probability predictor. The theory behind this low asking user engagement probability predictor is that if an asking user has been engaged and using a parent software system for less than a defined minimum amount of time, there is a greater likelihood that the asking user will not reengage the question and answer based customer support system, and/or leave review, feedback, or rating data, than would be the case if the asking user had been engaged in using a parent software system for greater than a defined minimum amount of time. Consequently, in one embodiment, the asking user using the software system for a time period less than a defined threshold time period is a low asking user engagement probability predictor.

As noted above, the low asking user engagement probability predictors include, but are not limited to, the predicted time to answer the question represented by the question data being greater than a defined threshold time low asking user engagement probability predictor. Using this low asking user engagement probability predictor an estimate is calculated regarding the amount of time that it will take to generate answer data associated with the question data submitted by the asking user. The theory behind this low asking user engagement probability predictor, empirically proved, is that the longer it is predicted that it will take to generate answer data associated with the question data submitted, the less likely the asking user is to reengage with the question and answer based customer support system, and/or leave review, feedback, or rating data. Consequently, in one embodiment, the predicted time to answer the question represented by the question data being greater than a defined threshold time is a low asking user engagement probability predictor.

In various embodiments, the low asking user engagement probability predictors can include, but are not limited to, any low asking user engagement probability predictor, or combination of low asking user engagement probability predictors, discussed herein, and/or as known in the art at the time of filing, and/or as developed after the time of filing.

In one embodiment, once low asking user engagement probability predictors are defined/identified, low asking user engagement probability predictors data representing the low asking user engagement probability predictors and analysis instructions required to identify the low asking user engagement probability predictors is generated and stored.

In one embodiment, questions represented by question data that include one or more low asking user engagement probability predictors are defined as low engagement probability questions and low engagement probability question data.

In accordance with one embodiment, question data is received representing a question submitted by an asking user through the question and answer based customer support system.

As discussed above, in one embodiment, users of the software system are provided the capability to submit product related questions regarding the installation, implementation, use, and operation of the software system, as well as subject matter related questions, through the question and answer based customer support system. In one embodiment, an asking user of the software system begins to enter, and/or submit, question data through the question and answer based customer support system and at least a portion of the question data is received by the question and answer based customer support system.

In one embodiment, questions submitted to the question and answer based customer support system by asking users are meant to be answered using the support resources, such as, but not limited to, the time and efforts of members of the support community of customer support personnel.

In various embodiments, the users of the software system enter question data through a question submission user interface provided through the question and answer based customer support system in the form of text data, audio data, symbolic data, and/or any other means, mechanism, process, or system, for entering question data as discussed herein, and/or as known in the art at the time of filing, and/or as developed after the time of filing.

In one embodiment, as, or after, the question data is being submitted/has been submitted by an asking user, but before allocating support resources to generating answer data related to the question data, the question data is analyzed to determine if the question data includes one or more low asking user engagement probability predictors and therefore represents a low engagement probability question.

In one embodiment, an asker engagement model computes an asker engagement score using the asker engagement predictors based on logistic regression or a neural network model and the asker engagement score is re-scaled, transformed, or re-normalized to produce an asker engagement probability float number from 0.0 to 1.0 or float number uniformly distributed from 0.0 to 1.0.

In one embodiment, as the question data is being entered by a user, and/or is otherwise received, the question data is parsed and analyzed before allocating support resources to provide answer data associated with the question data being submitted, as an example, before providing the question data to any of the one or more support personnel. As noted above, in one embodiment, questions submitted to the question and answer based customer support system by asking users are meant to be answered using the support resources, e.g., by members of the support community of customer support personnel. However, using the methods and systems disclosed herein, the question data is parsed and analyzed before allocating any support resources to generating answer data, e.g., before providing the question data to any of the one or more support personnel, to determine routing of the question data and/or if the question data represents a low engagement probability question.

In general, product related questions are best answered by paid professional agent support personnel in the employ of the provider of the software system while subject matter related questions are often best answered by volunteer support personnel, e.g., volunteer expert users of the software system. Consequently, in one embodiment, it is desirable to identify the broad category/subject matter of the questions, e.g., product related questions and subject matter related questions for routing either to professional agent support personnel or volunteer support personnel of the support community for the software system, depending on the subject matter of the question data.

To this end, in one embodiment, an initial parsing and analysis of submitted question data is performed to determine the type of question that is represented by the question data and then make a preliminary determination of what support resources might be allocated to the question data.

As a specific illustrative example, in one embodiment, an initial parsing and analysis of submitted question data is performed to determine if the question that is represented by the question data is a product related question or a subject matter related question. Then, if the question that is represented by the question data is determined to be a product related question, the question that is represented by the question data is preliminarily designated for routing to professional agent support personnel of the support community for the software system. In contrast, if the question that is represented by the question data is determined to be a subject matter related question, the question that is represented by the question data is preliminarily designated for routing to volunteer support personnel of the support community for the software system.

In one embodiment, as the question data is being entered and/or submitted, the question data is parsed and analyzed using the low asking user engagement probability predictors and analysis instructions required to identify the low asking user engagement probability predictors.

In one embodiment, if one or more low asking user engagement probability predictors are identified in the question data, the question data is determined to represent a low engagement probability question.

In one embodiment, if, based on the analysis of the question data, a determination is made that the question data represents a low engagement probability question, support resources are allocated to generating answer data related to the question data on a low priority basis.

In one embodiment, if, based on the analysis of the question data, a determination is made that the question data represents a low engagement probability question, support resources are allocated to generating answer data related to the question data on a low priority basis such that only after all question data representing high engagement probability questions are allocated resources, are any support resources allocated to question data representing low engagement probability questions; in one embodiment, on a first in/first out (FIFO) basis, i.e., in the order the question data representing low engagement probability questions is received.

In one embodiment, if, based on the analysis of the question data, a determination is made that the question data represents a low engagement probability question, support resources are never allocated to generating answer data related to the question data.

Consequently, using one embodiment of the methods and systems disclosed herein, asking user engagement with a question and answer based customer support system, e.g., the asking user's interaction with question and answer based customer support system after the asking user submits their question, is predicted using defined low asking user engagement probability predictors before any significant support resources are allocated to answering the question. Therefore, using one embodiment of the methods and systems disclosed herein, methods and systems are provided to reliably, efficiently, and proactively determine an asking user's predicted engagement with the question and answer based customer support system and then efficiently and effectively allocate support resources, such as volunteer and/or professional agent support personnel of a support community, accordingly. In this way, support resources are not wasted on question data representing questions from asking users that are not likely to ever return to check for answers to their questions, much less leave review and/or rating data.

In one embodiment a software system is provided. In various embodiments, the software system provided is any of the software systems discussed herein, and/or as known in art at the time of filing, and/or as developed after the time of filing.

In one embodiment a question and answer based customer support system, e.g., a social question and answer (Q&A) system, is provided to support users of the software system.

In various embodiments, the question and answer based customer support system provided is any of the question and answer based customer support systems discussed herein, and/or as known in art at the time of filing, and/or as developed after the time of filing.

In one embodiment, users of the software system are provided the capability to submit product type questions regarding the installation, implementation, use and operation of the software system, as well as subject matter type questions, through the question and answer based customer support system.

In one embodiment, the question and answer based customer support system includes one or more support resources which the users of the software system can access through the question and answer based customer support system. In various embodiments, the support resources include but are not limited to, phone-type support resources, chat-type support resources, text-based support resources, audio-based support resources, video-based support resources, support community-based support resources, and/or any support resources, or combination of support resources, as discussed herein, and/or as known/available in the art at the time of filing, and/or as developed/made available after the time of filing.

In one embodiment, the support resources are accessed by users to obtain answers, in the form of answer data, to questions submitted by the users in the form of question data to, or through, the question and answer based customer support system.

In one embodiment, the support resources include a support community of customer support personnel. In one embodiment, the customer support personnel include paid professional agent support personnel that are in the employ of the provider of the software system and non-paid volunteer support personnel, e.g., volunteer expert users, of the software system. In one embodiment, the volunteer support personnel of the software system are identified and certified by the provider of the software system.

In one embodiment, through the question and answer based customer support system, users of the software system are provided the capability to submit questions to members of the support community of customer support personnel in the form of submitted question data.

In accordance with one embodiment, high asking user engagement probability predictors are defined that, when present, indicate a high probability of asking user engagement once the asking user has submitted question data representing the asking user's question.

In various embodiments, the high asking user engagement probability predictors discovered by the inventors include, but are not limited to: a proper question format: a question length greater than a defined threshold question length; a question subject length greater than a defined threshold question subject length; the presence of a question mark at the end of the question data; proper punctuation in the question data; the asking user being associated with a paid version of the software system; the asking user being a known user of the software system; the asking user using the software system for a time period greater than a defined threshold time period; and the predicted time to answer the question represented by the question data being less than a defined threshold time.

As noted above, the high asking user engagement probability predictors include, but are not limited to, a proper question format high asking user engagement probability predictor.

As noted above, questions submitted to the question and answer based customer support system can be structured/formatted in a variety of ways and these various question type/formats can vary significantly in quality, and more importantly, in the predicted user satisfaction with an answer, any answer, to the question.

In one embodiment, each of these question structures is associated with a empirically calculated predictability that the answer to the question, whatever that answer may be, will be found satisfactory by the users, e.g., the asking user and/or searching users. As also discussed herein, this finding provided a practical framework for the disclosed embodiments of methods and systems for allocating support resources to a question based on analysis of the question content and predicted asker engagement before the answer content is generated. This is because a strong relationship was discovered by the Inventors between question quality content and question formatting at the question submission stage and asking user engagement. That is to say, it was discovered by the inventors that low-quality content and/or an improper question format at the question submission stage is a low asking user engagement probability predictor and high-quality content, and/or proper question format at the question submission stage is a high asking user engagement probability predictor. It is believed this discovered correlation reflects the thought and care that an asking user puts into a question submission that is indicative of the asking user's future engagement with the question and answer based customer support system. In short, if the asking user takes the time to submit high-quality content in the proper format at the question submission stage, it is more likely the asking user will return to the question and answer based customer support system to check for/review answer data, and leave reviews and feedback. Similarly, if the asking user does not take the time to submit high-quality content in the proper format at the question submission stage, i.e., submits low-quality content in an improper format at the question submission stage, it is less likely the asking user will return to the question and answer based customer support system to check for/review answer data, and leave reviews and feedback.

Consequently, in one embodiment, the high asking user engagement probability predictors include, but are not limited to, a proper question format high asking user engagement probability predictor.

In one embodiment, question data representing general knowledge/open-ended category questions are considered to be in an improper question format and therefore, as discussed below, are determined to be low engagement probability questions.

In one embodiment, closed-ended category questions submitted are identified. In general, closed-ended question formats are detectable using format analysis instructions that implement regular expressions analysis.

As seen in FIG. 1A, closed-ended questions result in an impressive 85.9% up vote, i.e., 85.9% of users who submit questions in the closed-ended format are satisfied with the answer provided. As also seen in FIG. 1A this is the highest satisfaction rating of all question formats. Consequently, question data representing questions in a closed-ended format are considered to be in a proper question format and therefore, as discussed below, are determined to be high engagement probability questions.

In one embodiment, if a question submitted to the question and answer based customer support system is deemed to be neither a general knowledge/open-ended nor a closed-ended format question, the question is classified as being in the ill-formed question category by default. Most of the ill-formed category questions do not follow a grammatically correct question format either intentionally, as in the case of a search query type, or unintentionally, e.g., wrong grammar, punctuation, etc. In one embodiment, question data representing questions in the ill-formed question category are considered to be in an improper question format and therefore, as discussed below, are determined to be low engagement probability questions.

In one embodiment, high quality question formats, and therefore, as discussed below, high engagement probability questions, are defined/identified based on the empirical data obtained as discussed above and shown in FIG. 1A.

As noted above, the high asking user engagement probability predictors include a question length greater than a defined threshold question length high asking user engagement probability predictor. Using this high asking user engagement probability predictor, the length of the question, i.e., the amount of question data submitted is analyzed and compared to a defined threshold question length. In one embodiment, the threshold question length is defined based on a determination of question length that is indicative of the required level of effort having been put forth by the asking user. In this case, the theory is that if the asking user puts forth enough effort to generate question data representing a question of at least the defined length, then the asking user is determined to be more likely to reengage the question and answer based customer support system once the question data has been submitted. In short, using this high asking user engagement probability predictor, if the asking user puts forth enough effort to submit a question of at least a minimum threshold length, then it is predicted that the asking user will put forth the effort to reengage with the question and answer based customer support system, and/or leave review, feedback, or rating data. Consequently, a question length greater than a defined threshold question length is a high asking user engagement probability predictor.

As noted above, the high asking user engagement probability predictors include, but are not limited to, a question subject length greater than a defined threshold question subject length high asking user engagement probability predictor. Using this high asking user engagement probability predictor the length of the question subject, i.e., the amount of question subject or header data submitted, is analyzed and compared to a defined threshold question subject length. In one embodiment, the threshold question subject length is defined based on a determination of question subject length that is indicative of the required level of effort having been put forth by the asking user. In this case, the theory is that if the asking user puts forth enough effort to generate question subject data representing a question subject of the defined length, then the asking user is determined to be more likely to reengage the question and answer based customer support system once the question data has been submitted, and/or leave review, feedback, or rating data. In short, using this high asking user engagement probability predictor, if the asking user puts forth enough effort to submit a question subject of at least a minimum threshold length, then it is predicted that the asking user will put forth the effort to reengage with the question and answer based customer support system, and/or leave review, feedback, or rating data. Consequently, a question subject length greater than a defined threshold question subject length is a high asking user engagement probability predictor.

As noted above, the high asking user engagement probability predictors include, but are not limited to, the presence of a question mark at the end of the question data high asking user engagement probability predictor. The theory behind this high asking user engagement probability predictor is that if the asking user takes the time, or pays enough attention to detail, to place a question mark at the end of the question represented by the question data, is more likely the asking user will take the time or energy to reengage the question answer based customer support system once the question data submitted, and/or leave review, feedback, or rating data. Consequently, in one embodiment, the presence of a question mark at the end of the question is a high asking user engagement probability predictor.

As noted above, the high asking user engagement probability predictors include, but are not limited to, proper punctuation in the question data high asking user engagement probability predictor. The theory behind this high asking user engagement probability predictor is that if the asking user takes the time, or pays enough attention to detail, to use proper punctuation in the question represented by the question data, it is more likely the asking user will take the time or energy to reengage the question answer based customer support system once the question data submitted, and/or leave review, feedback, or rating data. Consequently, in one embodiment, proper punctuation in the question data is a high asking user engagement probability predictor.

As noted above, the high asking user engagement probability predictors include, but are not limited to, the asking user being associated with a paid version of the software system high asking user engagement probability predictor. The theory behind this high asking user engagement probability predictor is that, as determined empirically, an asking user utilizing a free version of the parent software system is less likely to reengage with the question and answer based customer support system, and/or leave review, feedback, or rating data, than an asking user utilizing a version of the parent software system to the asking user has paid for. Consequently, in one embodiment, the asking user being associated with a paid version of the software system is a high asking user engagement probability predictor.

As noted above, the high asking user engagement probability predictors include, but are not limited to, the asking user being a known user of the software system high asking user engagement probability predictor. The theory behind this high asking user engagement probability predictor is that a user who is using the parent software system on a trial basis, and/or for the first time, is less likely to reengage with a question and answer based customer support system, and/or leave review, feedback, or rating data, than an asking user who has been using the software system for a defined period of time. Consequently, in one embodiment, the asking user being a known user of the software system is a high asking user engagement probability predictor.

As noted above, the high asking user engagement probability predictors include, but are not limited to, the asking user using the software system for a time period greater than a defined threshold time period high asking user engagement probability predictor. The theory behind this high asking user engagement probability predictor is that if an asking user has been engaged and using a parent software system for less than a defined minimum amount of time, there is a greater likelihood that the asking user will not reengage the question and answer based customer support system, and/or leave review, feedback, or rating data, than if the asking user had been engaged in using a parent software system for greater than a defined minimum amount of time. Consequently, in one embodiment, the asking user using the software system for a time period greater than a defined threshold time period is a high asking user engagement probability predictor.

As noted above, the high asking user engagement probability predictors include, but are not limited to, the predicted time to answer the question represented by the question data being less than a defined threshold time high asking user engagement probability predictor. Using this high asking user engagement probability predictor an estimate is calculated regarding the amount of time that it will take to generate answer data associated with the question data submitted by the asking user. The theory behind this high asking user engagement probability predictor, empirically proved, is that the longer it is predicted that it will take to generate answer data associated with the question data submitted, the less likely the asking user is to reengage with the question and answer based customer support system, and/or leave review, feedback, or rating data. Consequently, in one embodiment, the predicted time to answer the question represented by the question data being less than a defined threshold time is a high asking user engagement probability predictor.

In various embodiments, the high asking user engagement probability predictors can include, but are not limited to, any high asking user engagement probability predictor, or combination of high asking user engagement probability predictors, discussed herein, and/or as known in the art at the time of filing, and/or as developed after the time of filing.

In one embodiment, once high asking user engagement probability predictors are defined/identified, high asking user engagement probability predictors data representing the high asking user engagement probability predictors and analysis instructions required to identify the high asking user engagement probability predictors is generated and stored.

In one embodiment, questions represented by question data that include one or more high asking user engagement probability predictors are defined as high engagement probability questions.

In accordance with one embodiment, question data is received representing a question submitted by an asking user through the question and answer based customer support system.

As discussed above, in one embodiment, users of the software system are provided the capability to submit product related questions regarding the installation, implementation, use and operation of the software system, as well as subject matter related questions, through the question and answer based customer support system. In one embodiment, an asking user of the software system begins to enter, and/or submit, question data through the question and answer based customer support system and at least a portion of the question data is received by the question and answer based customer support system.

In one embodiment, questions submitted to the question and answer based customer support system by asking users are meant to be answered using the support resources, such as, but not limited to, the time and efforts of members of the support community of customer support personnel.

In various embodiments, the users of the software system enter question data through a question submission user interface provided through the question and answer based customer support system in the form of text data, audio data, symbolic data, and/or any other means, mechanism, process, or system, for entering question data as discussed herein, and/or as known in the art at the time of filing, and/or as developed after the time of filing.

In one embodiment, as, or after, the question data is being submitted by an asking user, but before allocating support resources to generating answer data related to the question data, the question data is analyzed to determine if the question data includes one or more high asking user engagement probability predictors and therefore represents a high engagement probability question.

In one embodiment, as the question data is being entered by a user, and/or is otherwise received, the question data is parsed and analyzed before allocating support resources to provide answer data associated with the question data being submitted, as an example, before providing the question data to any of the one or more support personnel. As noted above, in one embodiment, questions submitted to the question and answer based customer support system by asking users are meant to be answered using the support resources, e.g., by members of the support community of customer support personnel. However, using the methods and systems disclosed herein, the question data is parsed and analyzed before allocating any support resources to generating answer data, e.g., before providing the question data to any of the one or more support personnel, to determine routing of the question data and/or if the question data represents a high engagement probability question.

As discussed above, in general, product related questions are best answered by paid professional agent support personnel in the employ of the provider of the software system while subject matter related questions are often best answered by volunteer support personnel, e.g., volunteer expert users of the software system. Consequently, in one embodiment, it is desirable to identify the broad category/subject matter of the questions, e.g., product related questions and subject matter related questions for routing either to professional agent support personnel or volunteer support personnel of the support community for the software system, depending on the subject matter of the question data.

To this end, in one embodiment, an initial parsing and analysis of submitted question data is performed to determine the type of question that is represented by the question data and then make a preliminary determination of what support resources might be allocated to the question data.

In one embodiment, as the question data is being entered and/or submitted, the question data is parsed and analyzed using the high asking user engagement probability predictors and analysis instructions required to identify the high asking user engagement probability predictors.

In one embodiment, if one or more high asking user engagement probability predictors are identified in the question data, the question data is determined to represent a high engagement probability question.

In one embodiment, an asker engagement model computes an asker engagement score using the asker engagement predictors based on logistic regression or a neural network model and the asker engagement score is re-scaled, transformed, or re-normalized to produce an asker engagement probability float number from 0.0 to 1.0 or float number uniformly distributed from 0.0 to 1.0.

In one embodiment, if, based on the analysis of the question data, a determination is made that the question data represents a high engagement probability question, support resources are allocated to generating answer data related to the question data on a high priority basis.

In one embodiment, if, based on the analysis of the question data, a determination is made that the question data represents a low engagement probability question, support resources are allocated to generating answer data related to the question data on a low priority basis such that only after all question data representing high engagement probability questions are allocated resources, are any support resources allocated to question data representing low engagement probability questions; in one embodiment, on a first in/first out basis, i.e., in the order the question data representing low engagement probability questions is received.

In one embodiment, if, based on the analysis of the question data, a determination is made that the question data represents a low engagement probability question, support resources are never allocated to generating answer data related to the question data.

Consequently, using one embodiment of the methods and systems disclosed herein, asking user engagement with a question and answer based customer support system, e.g., the asking user's interaction with question and answer based customer support system after the asking user submits their question, is predicted using defined high asking user engagement probability predictors before any significant support resources are allocated to answering the question. Therefore, using one embodiment of the methods and systems disclosed herein, methods and systems are provided to reliably, efficiently, and proactively determine an asking user's predicted engagement with the question and answer based customer support system and then efficiently and effectively allocate support resources, such as volunteer and/or professional agent support personnel of a support community, accordingly. In this way, support resources are not wasted.

The disclosed embodiments do not encompass, embody, or preclude other forms of innovation in the area of customer support and question and answer based customer support systems. In addition, the disclosed embodiments are not related to any fundamental economic practice and, in fact, are directed to the relatively new technical area of electronic data based customer support systems and software system support. Consequently, the disclosed embodiments are not directed to, do not encompass, and are not merely abstract ideas or concepts.

The disclosed method and system for allocating support resources to a question based on analysis of the question content and predicted asker engagement before the answer content is generated provides for significant improvements to the technical fields of customer support, information dissemination, software implementation, and user experience. In addition, using the disclosed method and system for allocating support resources to a question based on analysis of the question content and predicted asker engagement before the answer content is generated results in more efficient use of human and non-human resources, fewer processor cycles being utilized, reduced memory utilization, and less communications bandwidth being utilized to relay data to and from backend systems. As a result, computing systems are transformed into faster, more efficient, and more effective computing systems by implementing the method and system for allocating support resources to a question based on analysis of the question content and predicted asker engagement before the answer content is generated disclosed herein.

Process

In one embodiment, a process for allocating support resources to a question based on analysis of the question content and predicted asker engagement before the answer content is generated includes providing a software system to one or more users. In one embodiment, users of the software system are provided a question and answer based customer support system through which question data can be entered by the users representing questions to potentially be provided to one or more support resources associated with the question and answer based customer support system so that the questions represented by the question data can be answered via answer data generated using the support resources.

In accordance with one embodiment, low asking user engagement probability predictors are defined that, when present, indicate a low probability of asking user engagement once the asking user has submitted question data representing the asking user's question. In one embodiment, questions represented by question data that include one or more low asking user engagement probability predictors are defined as low engagement probability questions.

In accordance with one embodiment, question data is received representing a question submitted by an asking user through the question and answer based customer support system. In one embodiment, before allocating support resources to generating answer data related to the question data, the question data is analyzed to determine if the question data includes one or more low asking user engagement probability predictors and therefore represents a low engagement probability question.

In accordance with one embodiment, if, based on the analysis of the question data, a determination is made that the question data represents a low engagement probability question, support resources are allocated to generating answer data related to the question data on a low priority basis.

Figure 3:
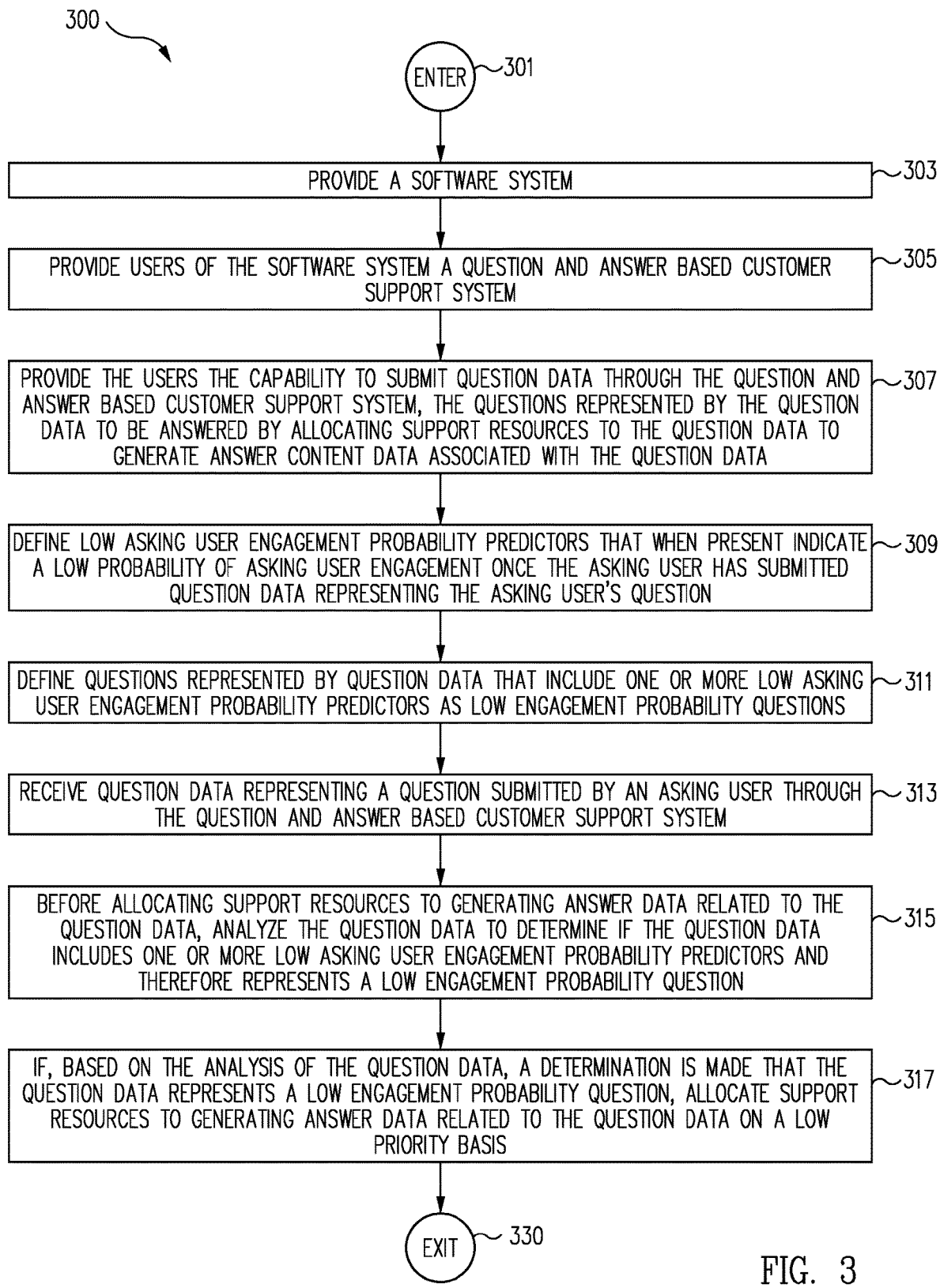
FIG. 3 is a flow chart representing one example of a generalized process for allocating support resources to a question based on analysis of the question content and predicted asker engagement before the answer content is generated in accordance with one embodiment.

FIG. 3 is a flow chart representing one example of a process 300 for allocating support resources to a question based on analysis of the question content and predicted asker engagement before the answer content is generated in accordance with one embodiment.

As seen in FIG. 3, process 300 for allocating support resources to a question based on analysis of the question content and predicted asker engagement before the answer content is generated begins at ENTER OPERATION 301 and process flow proceeds to PROVIDE A SOFTWARE SYSTEM OPERATION 303.

In one embodiment, at PROVIDE A SOFTWARE SYSTEM OPERATION 303, a software system is provided for use by one or more users. In various embodiments, the software system of PROVIDE A SOFTWARE SYSTEM OPERATION 303 is any software system as discussed herein, and/or as known at the time of filing, and/or as developed after the time of filing.

In one embodiment, once a software system is provided at PROVIDE A SOFTWARE SYSTEM OPERATION 303, process flow proceeds to PROVIDE USERS OF THE SOFTWARE SYSTEM A QUESTION AND ANSWER BASED CUSTOMER SUPPORT SYSTEM OPERATION 305.

In one embodiment, at PROVIDE USERS OF THE SOFTWARE SYSTEM A QUESTION AND ANSWER BASED CUSTOMER SUPPORT SYSTEM OPERATION 305 a question and answer based customer support system, e.g., a social question and answer (Q&A) system, is provided to support customers/users of the software system of PROVIDE A SOFTWARE SYSTEM OPERATION 303.

In one embodiment, the question and answer based customer support system of PROVIDE USERS OF THE SOFTWARE SYSTEM A QUESTION AND ANSWER BASED CUSTOMER SUPPORT SYSTEM OPERATION 305 is any question and answer based customer support system as discussed herein, and/or as known in the art at the time of filing and/or as developed after the time of filing, which serves as a discussion forum in an area of endeavor related to the software system.

In one embodiment, once a question and answer based customer support system is provided to support customers/users of the software system of PROVIDE A SOFTWARE SYSTEM OPERATION 303 at PROVIDE USERS OF THE SOFTWARE SYSTEM A QUESTION AND ANSWER BASED CUSTOMER SUPPORT SYSTEM OPERATION 305. process flow proceeds to PROVIDE THE USERS THE CAPABILITY TO SUBMIT QUESTION DATA THROUGH THE QUESTION AND ANSWER BASED CUSTOMER SUPPORT SYSTEM, THE QUESTIONS REPRESENTED BY THE QUESTION DATA TO BE ANSWERED BY ALLOCATING SUPPORT RESOURCES TO THE QUESTION DATA TO GENERATE ANSWER DATA ASSOCIATED WITH THE QUESTION DATA OPERATION 307

In one embodiment, at PROVIDE THE USERS THE CAPABILITY TO SUBMIT QUESTION DATA THROUGH THE QUESTION AND ANSWER BASED CUSTOMER SUPPORT SYSTEM, THE QUESTIONS REPRESENTED BY THE QUESTION DATA TO BE ANSWERED BY ALLOCATING SUPPORT RESOURCES TO THE QUESTION DATA TO GENERATE ANSWER DATA ASSOCIATED WITH THE QUESTION DATA OPERATION 307 users of the software system are provided the capability to submit questions regarding the software system of PROVIDE A SOFTWARE SYSTEM OPERATION 303 through the question and answer based customer support system of PROVIDE USERS OF THE SOFTWARE SYSTEM A QUESTION AND ANSWER BASED CUSTOMER SUPPORT SYSTEM OPERATION 305.

In one embodiment, at PROVIDE THE USERS THE CAPABILITY TO SUBMIT QUESTION DATA THROUGH THE QUESTION AND ANSWER BASED CUSTOMER SUPPORT SYSTEM, THE QUESTIONS REPRESENTED BY THE QUESTION DATA TO BE ANSWERED BY ALLOCATING SUPPORT RESOURCES TO THE QUESTION DATA TO GENERATE ANSWER DATA ASSOCIATED WITH THE QUESTION DATA OPERATION 307 through the question and answer based customer support system of PROVIDE USERS OF THE SOFTWARE SYSTEM A QUESTION AND ANSWER BASED CUSTOMER SUPPORT SYSTEM OPERATION 305, users of the software system of PROVIDE A SOFTWARE SYSTEM OPERATION 303 are provided the capability to submit product questions regarding the installation, implementation, use and operation of the software system, as well as subject matter questions.

In one embodiment, once users of the software system are provided the capability to submit questions regarding the installation, implementation, use and operation of the software system of PROVIDE A SOFTWARE SYSTEM OPERATION 303 through the question and answer based customer support system of PROVIDE USERS OF THE SOFTWARE SYSTEM A QUESTION AND ANSWER BASED CUSTOMER SUPPORT SYSTEM OPERATION 305 at PROVIDE THE USERS THE CAPABILITY TO SUBMIT QUESTION DATA THROUGH THE QUESTION AND ANSWER BASED CUSTOMER SUPPORT SYSTEM, THE QUESTIONS REPRESENTED BY THE QUESTION DATA TO BE ANSWERED BY ALLOCATING SUPPORT RESOURCES TO THE QUESTION DATA TO GENERATE ANSWER DATA ASSOCIATED WITH THE QUESTION DATA OPERATION 307, process flow proceeds to DEFINE LOW ASKING USER ENGAGEMENT PROBABILITY PREDICTORS THAT WHEN PRESENT INDICATE A LOW PROBABILITY OF ASKING USER ENGAGEMENT ONCE THE ASKING USER HAS SUBMITTED QUESTION DATA REPRESENTING THE ASKING USER'S QUESTION OPERATION 309.

In one embodiment, at DEFINE LOW ASKING USER ENGAGEMENT PROBABILITY PREDICTORS THAT WHEN PRESENT INDICATE A LOW PROBABILITY OF ASKING USER ENGAGEMENT ONCE THE ASKING USER HAS SUBMITTED QUESTION DATA REPRESENTING THE ASKING USER'S QUESTION OPERATION 309, low asking user engagement probability predictors are defined that, when present, indicate a low probability of asking user engagement once the asking user has submitted question data representing the asking user's question.

In various embodiments, the low asking user engagement probability predictors of DEFINE LOW ASKING USER ENGAGEMENT PROBABILITY PREDICTORS THAT WHEN PRESENT INDICATE A LOW PROBABILITY OF ASKING USER ENGAGEMENT ONCE THE ASKING USER HAS SUBMITTED QUESTION DATA REPRESENTING THE ASKING USER'S QUESTION OPERATION 309 include, but are not limited to: improper question format; a question length less than a defined threshold question length; a question subject length less than a defined threshold question subject length; the absence of a question mark at the end of the question; improper, or absent, punctuation in the question data; the asking user being associated with a free version of the software system; the asking user being a new user of the software system; the asking user using the software system for a time period less than a defined threshold time period; and the predicted time to answer the question represented by the question data being greater than a defined threshold time.

In various embodiments, the low asking user engagement probability predictors can include, but are not limited to, any low asking user engagement probability predictor, or combination of low asking user engagement probability predictors, discussed herein, and/or as known in the art at the time of filing, and/or as developed after the time of filing.

In one embodiment, once low asking user engagement probability predictors are defined/identified, low asking user engagement probability predictors data representing the low asking user engagement probability predictors and analysis instructions required to identify the low asking user engagement probability predictors is generated and stored.

In one embodiment, once low asking user engagement probability predictors are defined that, when present, indicate a low probability of asking user engagement once the asking user has submitted question data representing the asking user's question at DEFINE LOW ASKING USER ENGAGEMENT PROBABILITY PREDICTORS THAT WHEN PRESENT INDICATE A LOW PROBABILITY OF ASKING USER ENGAGEMENT ONCE THE ASKING USER HAS SUBMITTED QUESTION DATA REPRESENTING THE ASKING USER'S QUESTION OPERATION 309, process flow proceeds to DEFINE QUESTIONS REPRESENTED BY QUESTION DATA THAT INCLUDE ONE OR MORE LOW ASKING USER ENGAGEMENT PROBABILITY PREDICTORS AS LOW ENGAGEMENT PROBABILITY QUESTIONS OPERATION 311.

In one embodiment, at DEFINE QUESTIONS REPRESENTED BY QUESTION DATA THAT INCLUDE ONE OR MORE LOW ASKING USER ENGAGEMENT PROBABILITY PREDICTORS AS LOW ENGAGEMENT PROBABILITY QUESTIONS OPERATION 311, questions represented by question data that include one or more of the low asking user engagement probability predictors of DEFINE LOW ASKING USER ENGAGEMENT PROBABILITY PREDICTORS THAT WHEN PRESENT INDICATE A LOW PROBABILITY OF ASKING USER ENGAGEMENT ONCE THE ASKING USER HAS SUBMITTED QUESTION DATA REPRESENTING THE ASKING USER'S QUESTION OPERATION 309 are defined as low engagement probability questions and low engagement probability question data.

In one embodiment, once questions represented by question data that include one or more of the low asking user engagement probability predictors are defined as low engagement probability questions and low engagement probability question data at DEFINE QUESTIONS REPRESENTED BY QUESTION DATA THAT INCLUDE ONE OR MORE LOW ASKING USER ENGAGEMENT PROBABILITY PREDICTORS AS LOW ENGAGEMENT PROBABILITY QUESTIONS OPERATION 311, process flow proceeds to RECEIVE QUESTION DATA REPRESENTING A QUESTION SUBMITTED BY AN ASKING USER THROUGH THE QUESTION AND ANSWER BASED CUSTOMER SUPPORT SYSTEM OPERATION 313.

In one embodiment, at RECEIVE QUESTION DATA REPRESENTING A QUESTION SUBMITTED BY AN ASKING USER THROUGH THE QUESTION AND ANSWER BASED CUSTOMER SUPPORT SYSTEM OPERATION 313, question data is received representing a question submitted by an asking user through the question and answer based customer support system.

As discussed above, in one embodiment, users of the software system of PROVIDE A SOFTWARE SYSTEM OPERATION 303 are provided the capability to submit questions regarding the installation, implementation, use and operation of the software system of PROVIDE A SOFTWARE SYSTEM OPERATION 303 through the question and answer based customer support system of PROVIDE USERS OF THE SOFTWARE SYSTEM A QUESTION AND ANSWER BASED CUSTOMER SUPPORT SYSTEM OPERATION 305.

In one embodiment, at RECEIVE QUESTION DATA REPRESENTING A QUESTION SUBMITTED BY AN ASKING USER THROUGH THE QUESTION AND ANSWER BASED CUSTOMER SUPPORT SYSTEM OPERATION 313, a user of the software system of PROVIDE A SOFTWARE SYSTEM OPERATION 303 begins to enter, and/or submit, question data through the question and answer based customer support system of PROVIDE USERS OF THE SOFTWARE SYSTEM A QUESTION AND ANSWER BASED CUSTOMER SUPPORT SYSTEM OPERATION 305 and at least a portion of the question data is received by the question and answer based customer support system of PROVIDE USERS OF THE SOFTWARE SYSTEM A QUESTION AND ANSWER BASED CUSTOMER SUPPORT SYSTEM OPERATION 305.

In one embodiment, questions submitted to the question and answer based customer support system by asking users at RECEIVE QUESTION DATA REPRESENTING A QUESTION SUBMITTED BY AN ASKING USER THROUGH THE QUESTION AND ANSWER BASED CUSTOMER SUPPORT SYSTEM OPERATION 313 are meant to be answered using the support resources, such as, but not limited to, the time and efforts of members of the support community of customer support personnel.

In various embodiments, at RECEIVE QUESTION DATA REPRESENTING A QUESTION SUBMITTED BY AN ASKING USER THROUGH THE QUESTION AND ANSWER BASED CUSTOMER SUPPORT SYSTEM OPERATION 313 the users of the software system enter question data through a question submission user interface provided through the question and answer based customer support system in the form of text data, audio data, symbolic data, and/or any other means, mechanism, process, or system, for entering question data as discussed herein, and/or as known in the art at the time of filing, and/or as developed after the time of filing.

As noted above, questions submitted to the question and answer based customer support system at RECEIVE QUESTION DATA REPRESENTING A QUESTION SUBMITTED BY AN ASKING USER THROUGH THE QUESTION AND ANSWER BASED CUSTOMER SUPPORT SYSTEM OPERATION 313 can be formulated in a variety of ways and directed to various broad categories/subjects and in various question formats representing various question types.

In one embodiment, once a user of the software system begins to enter, and/or submit, question data through the question and answer based customer support system, and at least a portion of the question data is received by the question and answer based customer support system, at RECEIVE QUESTION DATA REPRESENTING A QUESTION SUBMITTED BY AN ASKING USER THROUGH THE QUESTION AND ANSWER BASED CUSTOMER SUPPORT SYSTEM OPERATION 313, process flow proceeds to BEFORE ALLOCATING SUPPORT RESOURCES TO GENERATING ANSWER DATA RELATED TO THE QUESTION DATA, ANALYZE THE QUESTION DATA TO DETERMINE IF THE QUESTION DATA INCLUDES ONE OR MORE LOW ASKING USER ENGAGEMENT PROBABILITY PREDICTORS AND THEREFORE REPRESENTS A LOW ENGAGEMENT PROBABILITY QUESTION OPERATION 315.

In one embodiment, at BEFORE ALLOCATING SUPPORT RESOURCES TO GENERATING ANSWER DATA RELATED TO THE QUESTION DATA, ANALYZE THE QUESTION DATA TO DETERMINE IF THE QUESTION DATA INCLUDES ONE OR MORE LOW ASKING USER ENGAGEMENT PROBABILITY PREDICTORS AND THEREFORE REPRESENTS A LOW ENGAGEMENT PROBABILITY QUESTION OPERATION 315 as, or after, the question data is being submitted/has been submitted by an asking user, but before allocating support resources to generating answer data related to the question data, the question data is analyzed to determine if the question data includes one or more low asking user engagement probability predictors and therefore represents a low engagement probability question.

In one embodiment, as the question data is being entered by a user, and/or is otherwise received, the question data is parsed and analyzed before allocating support resources to provide answer data associated with the question data being submitted, as an example, before providing the question data to any of the one or more support personnel. As noted above, in one embodiment, questions submitted to the question and answer based customer support system by asking users are meant to be answered using the support resources, e.g., by members of the support community of customer support personnel. However, using the methods and systems disclosed herein, the question data is parsed and analyzed before allocating any support resources to generating answer data, e.g., before providing the question data to any of the one or more support personnel, to determine routing of the question data and/or if the question data represents a low engagement probability question.

In general, product related questions are best answered by paid professional agent support personnel in the employ of the provider of the software system while subject matter related questions are often best answered by volunteer support personnel, e.g., volunteer expert users of the software system. Consequently, in one embodiment, it is desirable to identify the broad category/subject matter of the questions, e.g., product related questions and subject matter related questions for routing either to professional agent support personnel or volunteer support personnel of the support community for the software system, depending on the subject matter of the question data.

To this end, in one embodiment, an initial parsing and analysis of submitted question data is performed to determine the type of question that is represented by the question data and then make a preliminary determination of what support resources might be allocated to the question data.

As a specific illustrative example, in one embodiment, an initial parsing and analysis of submitted question data is performed to determine if the question that is represented by the question data is a product related question or a subject matter related question. Then, if the question that is represented by the question data is determined to be a product related question, the question that is represented by the question data is preliminarily designated for routing to professional agent support personnel of the support community for the software system. In contrast, if the question that is represented by the question data is determined to be a subject matter related question, the question that is represented by the question data is preliminarily designated for routing to volunteer support personnel of the support community for the software system.

In one embodiment, as the question data is being entered and/or submitted, the question data is parsed and analyzed using the low asking user engagement probability predictors and analysis instructions required to identify the low asking user engagement probability predictors.

In one embodiment, if one or more low asking user engagement probability predictors are identified in the question data, the question data is determined to represent a low engagement probability question.

In one embodiment, an asker engagement model computes an asker engagement score using the asker engagement predictors based on logistic regression or a neural network model and the asker engagement score is re-scaled, transformed, or re-normalized to produce an asker engagement probability float number from 0.0 to 1.0 or float number uniformly distributed from 0.0 to 1.0.

In one embodiment, once as, or after, the question data is being submitted/has been submitted by an asking user, but before allocating support resources to generating answer data related to the question data, the question data is analyzed to determine if the question data includes one or more low asking user engagement probability predictors and therefore represents a low engagement probability question at BEFORE ALLOCATING SUPPORT RESOURCES TO GENERATING ANSWER DATA RELATED TO THE QUESTION DATA, ANALYZE THE QUESTION DATA TO DETERMINE IF THE QUESTION DATA INCLUDES ONE OR MORE LOW ASKING USER ENGAGEMENT PROBABILITY PREDICTORS AND THEREFORE REPRESENTS A LOW ENGAGEMENT PROBABILITY QUESTION OPERATION 315, process flow proceeds to IF, BASED ON THE ANALYSIS OF THE QUESTION DATA, A DETERMINATION IS MADE THAT THE QUESTION DATA REPRESENTS A LOW ENGAGEMENT PROBABILITY QUESTION, ALLOCATE SUPPORT RESOURCES TO GENERATING ANSWER DATA RELATED TO THE QUESTION DATA ON A LOW PRIORITY BASIS OPERATION 317.

In one embodiment, at IF, BASED ON THE ANALYSIS OF THE QUESTION DATA, A DETERMINATION IS MADE THAT THE QUESTION DATA REPRESENTS A LOW ENGAGEMENT PROBABILITY QUESTION, ALLOCATE SUPPORT RESOURCES TO GENERATING ANSWER DATA RELATED TO THE QUESTION DATA ON A LOW PRIORITY BASIS OPERATION 317, if, based on the analysis of the question data, a determination is made that the question data represents a low engagement probability question, support resources are allocated to generating answer data related to the question data on a low priority basis.

In one embodiment, if, based on the analysis of the question data, a determination is made that the question data represents a low engagement probability question, support resources are allocated to generating answer data related to the question data on a low priority basis such that only after all question data representing high engagement probability questions are allocated resources, are any support resources allocated to question data representing low engagement probability questions; in one embodiment, on a first in/first out (FIFO) basis, i.e., in the order the question data representing low engagement probability questions is received.

In one embodiment, if, based on the analysis of the question data, a determination is made that the question data represents a low engagement probability question, support resources are never allocated to generating answer data related to the question data.

In one embodiment, once, if, based on the analysis of the question data, a determination is made that the question data represents a low engagement probability question, support resources are allocated to generating answer data related to the question data on a low priority basis at IF, BASED ON THE ANALYSIS OF THE QUESTION DATA, A DETERMINATION IS MADE THAT THE QUESTION DATA REPRESENTS A LOW ENGAGEMENT PROBABILITY QUESTION, ALLOCATE SUPPORT RESOURCES TO GENERATING ANSWER DATA RELATED TO THE QUESTION DATA ON A LOW PRIORITY BASIS OPERATION 317, process flow proceeds to EXIT OPERATION 330.

In one embodiment, at EXIT OPERATION 330 process 300 for allocating support resources to a question based on analysis of the question content and predicted asker engagement before the answer content is generated is exited to await new data.

Using process 300 for allocating support resources to a question based on analysis of the question content and predicted asker engagement before the answer content is generated, asking user engagement with a question and answer based customer support system, e.g., the asking user's interaction with question and answer based customer support system after the asking user submits their question, is predicted using defined low asking user engagement probability predictors before any significant support resources are allocated to answering the question. Therefore, process 300 for allocating support resources to a question based on analysis of the question content and predicted asker engagement before the answer content is generated, methods and systems are provided to reliably, efficiently, and proactively determine an asking user's predicted engagement with the question and answer based customer support system and then efficiently and effectively allocate support resources, such as volunteer and/or professional agent support personnel of a support community, accordingly. In this way, support resources are not wasted.

In one embodiment, a process for allocating support resources to a question based on analysis of the question content and predicted asker engagement before the answer content is generated includes providing a software system to one or more users. In one embodiment, users of the software system are provided a question and answer based customer support system through which question data can be entered by the users representing questions to potentially be provided to one or more support resources associated with the question and answer based customer support system so that the questions represented by the question data can be answered via answer data generated using the support resources.

In accordance with one embodiment, high asking user engagement probability predictors are defined that, when present, indicate a high probability of asking user engagement once the asking user has submitted question data representing the asking user's question. In one embodiment, questions represented by question data that include one or more high asking user engagement probability predictors are defined as high engagement probability questions.

In accordance with one embodiment, question data is received representing a question submitted by an asking user through the question and answer based customer support system. In one embodiment, before allocating support resources to generating answer data related to the question data, the question data is analyzed to determine if the question data includes one or more high asking user engagement probability predictors and therefore represents a high engagement probability question.

In accordance with one embodiment, if, based on the analysis of the question data, a determination is made that the question data represents a high engagement probability question, support resources are allocated to generating answer data related to the question data on a high priority basis.

Figure 4:
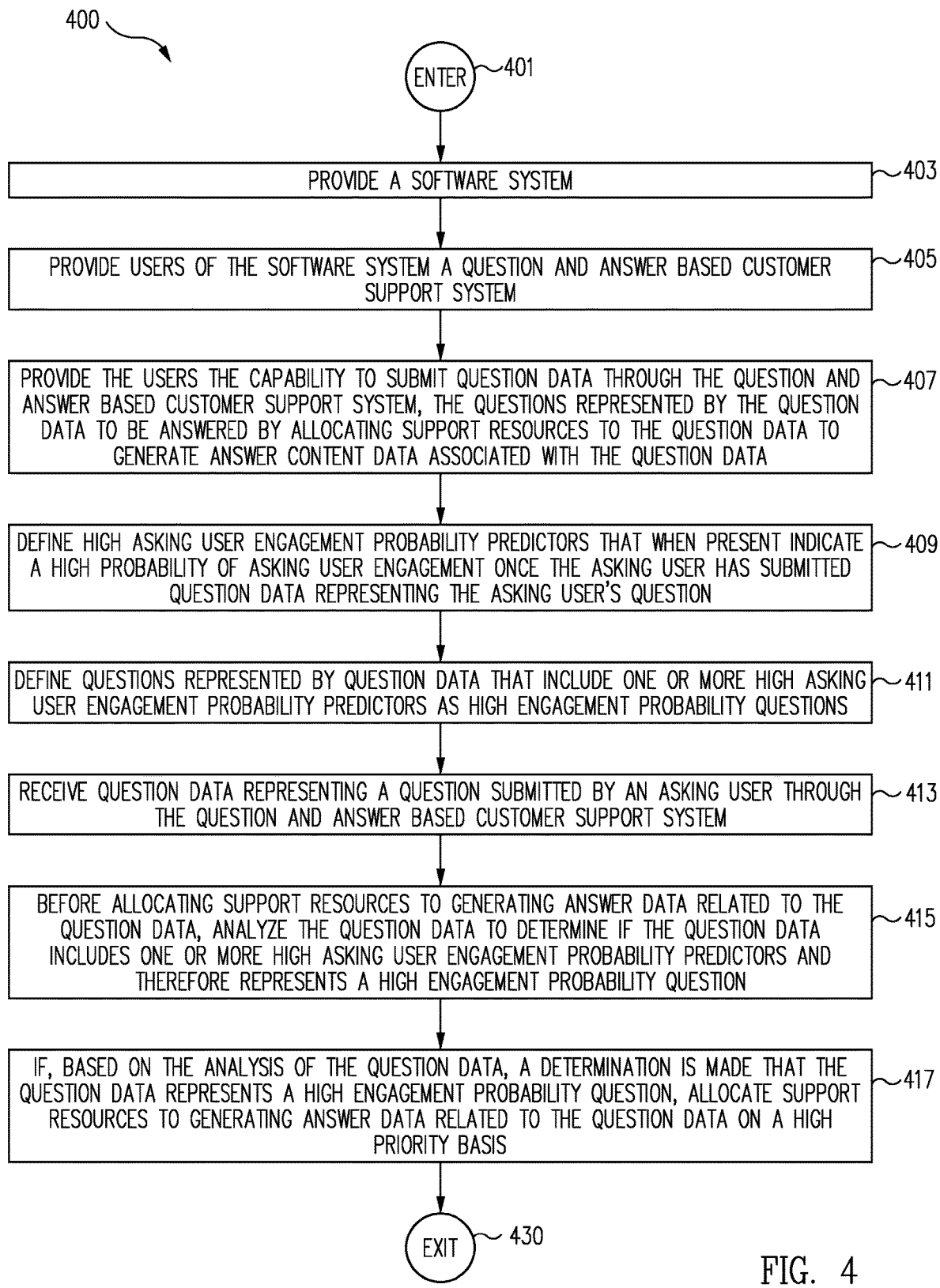
FIG. 4 is a flow chart representing one example of a generalized process for allocating support resources to a question based on analysis of the question content and predicted asker engagement before the answer content is generated in accordance with one embodiment.

FIG. 4 is a flow chart representing one example of a process 400 for allocating support resources to a question based on analysis of the question content and predicted asker engagement before the answer content is generated in accordance with one embodiment.

As seen in FIG. 4, process 400 for allocating support resources to a question based on analysis of the question content and predicted asker engagement before the answer content is generated begins at ENTER OPERATION 401 and process flow proceeds to PROVIDE A SOFTWARE SYSTEM OPERATION 403.

In one embodiment, at PROVIDE A SOFTWARE SYSTEM OPERATION 403, a software system is provided for use by one or more users. In various embodiments, the software system of PROVIDE A SOFTWARE SYSTEM OPERATION 403 is any software system as discussed herein, and/or as known at the time of filling, and/or as developed after the time of filing.

In one embodiment, once a software system is provided at PROVIDE A SOFTWARE SYSTEM OPERATION 403, process flow proceeds to PROVIDE USERS OF THE SOFTWARE SYSTEM A QUESTION AND ANSWER BASED CUSTOMER SUPPORT SYSTEM OPERATION 405.

In one embodiment, at PROVIDE USERS OF THE SOFTWARE SYSTEM A QUESTION AND ANSWER BASED CUSTOMER SUPPORT SYSTEM OPERATION 405 a question and answer based customer support system, e.g., a social question and answer (Q&A) system, is provided to support customers/users of the software system of PROVIDE A SOFTWARE SYSTEM OPERATION 403.

In one embodiment, the question and answer based customer support system of PROVIDE USERS OF THE SOFTWARE SYSTEM A QUESTION AND ANSWER BASED CUSTOMER SUPPORT SYSTEM OPERATION 405 is any question and answer based customer support system as discussed herein, and/or as known in the art at the time of filing and/or as developed after the time of filing, which serves as a discussion forum in an area of endeavor related to the software system.

In one embodiment, once a question and answer based customer support system is provided to support customers/users of the software system of PROVIDE A SOFTWARE SYSTEM OPERATION 403 at PROVIDE USERS OF THE SOFTWARE SYSTEM A QUESTION AND ANSWER BASED CUSTOMER SUPPORT SYSTEM OPERATION 405. process flow proceeds to PROVIDE THE USERS THE CAPABILITY TO SUBMIT QUESTION DATA THROUGH THE QUESTION AND ANSWER BASED CUSTOMER SUPPORT SYSTEM, THE QUESTIONS REPRESENTED BY THE QUESTION DATA TO BE ANSWERED BY ALLOCATING SUPPORT RESOURCES TO THE QUESTION DATA TO GENERATE ANSWER DATA ASSOCIATED WITH THE QUESTION DATA OPERATION 407.

In one embodiment, at PROVIDE THE USERS THE CAPABILITY TO SUBMIT QUESTION DATA THROUGH THE QUESTION AND ANSWER BASED CUSTOMER SUPPORT SYSTEM, THE QUESTIONS REPRESENTED BY THE QUESTION DATA TO BE ANSWERED BY ALLOCATING SUPPORT RESOURCES TO THE QUESTION DATA TO GENERATE ANSWER DATA ASSOCIATED WITH THE QUESTION DATA OPERATION 407 users of the software system are provided the capability to submit questions regarding the software system of PROVIDE A SOFTWARE SYSTEM OPERATION 403 through the question and answer based customer support system of PROVIDE USERS OF THE SOFTWARE SYSTEM A QUESTION AND ANSWER BASED CUSTOMER SUPPORT SYSTEM OPERATION 405 in any manner as discussed herein, and/or as known in the art at the time of filing, and/or as developed after the time of filing.

In one embodiment, once users of the software system are provided the capability to submit questions regarding the installation, implementation, use and operation of the software system of PROVIDE A SOFTWARE SYSTEM OPERATION 403 through the question and answer based customer support system of PROVIDE USERS OF THE SOFTWARE SYSTEM A QUESTION AND ANSWER BASED CUSTOMER SUPPORT SYSTEM OPERATION 305 at PROVIDE THE USERS THE CAPABILITY TO SUBMIT QUESTION DATA THROUGH THE QUESTION AND ANSWER BASED CUSTOMER SUPPORT SYSTEM, THE QUESTIONS REPRESENTED BY THE QUESTION DATA TO BE ANSWERED BY ALLOCATING SUPPORT RESOURCES TO THE QUESTION DATA TO GENERATE ANSWER DATA ASSOCIATED WITH THE QUESTION DATA OPERATION 407, process flow proceeds to DEFINE HIGH ASKING USER ENGAGEMENT PROBABILITY PREDICTORS THAT WHEN PRESENT INDICATE A HIGH PROBABILITY OF ASKING USER ENGAGEMENT ONCE THE ASKING USER HAS SUBMITTED QUESTION DATA REPRESENTING THE ASKING USER'S QUESTION OPERATION 409.

In one embodiment, at DEFINE HIGH ASKING USER ENGAGEMENT PROBABILITY PREDICTORS THAT WHEN PRESENT INDICATE A HIGH PROBABILITY OF ASKING USER ENGAGEMENT ONCE THE ASKING USER HAS SUBMITTED QUESTION DATA REPRESENTING THE ASKING USER'S QUESTION OPERATION 409, high asking user engagement probability predictors are defined that, when present, indicate a high probability of asking user engagement once the asking user has submitted question data representing the asking user's question.

In various embodiments, the high asking user engagement probability predictors of at DEFINE HIGH ASKING USER ENGAGEMENT PROBABILITY PREDICTORS THAT WHEN PRESENT INDICATE A HIGH PROBABILITY OF ASKING USER ENGAGEMENT ONCE THE ASKING USER HAS SUBMITTED QUESTION DATA REPRESENTING THE ASKING USER'S QUESTION OPERATION 409 include, but are not limited to: a proper question format: a question length greater than a defined threshold question length; a question subject length greater than a defined threshold question subject length; the presence of a question mark at the end of the question data; proper punctuation in the question data; the asking user being associated with a paid version of the software system; the asking user being a known user of the software system; the asking user using the software system for a time period greater than a defined threshold time period; and the predicted time to answer the question represented by the question data being less than a defined threshold time.

In various embodiments, the high asking user engagement probability predictors can include, but are not limited to, any high asking user engagement probability predictor, or combination of high asking user engagement probability predictors, discussed herein, and/or as known in the art at the time of filing, and/or as developed after the time of filing.

In one embodiment, once high asking user engagement probability predictors are defined/identified, high asking user engagement probability predictors data representing the high asking user engagement probability predictors and analysis instructions required to identify the high asking user engagement probability predictors is generated and stored.

In one embodiment, once high asking user engagement probability predictors are defined that, when present, indicate a high probability of asking user engagement once the asking user has submitted question data representing the asking user's question at DEFINE HIGH ASKING USER ENGAGEMENT PROBABILITY PREDICTORS THAT WHEN PRESENT INDICATE A HIGH PROBABILITY OF ASKING USER ENGAGEMENT ONCE THE ASKING USER HAS SUBMITTED QUESTION DATA REPRESENTING THE ASKING USER'S QUESTION OPERATION 409, process flow proceeds to DEFINE QUESTIONS REPRESENTED BY QUESTION DATA THAT INCLUDE ONE OR MORE HIGH ASKING USER ENGAGEMENT PROBABILITY PREDICTORS AS HIGH ENGAGEMENT PROBABILITY QUESTIONS OPERATION 411.

In one embodiment, at DEFINE QUESTIONS REPRESENTED BY QUESTION DATA THAT INCLUDE ONE OR MORE HIGH ASKING USER ENGAGEMENT PROBABILITY PREDICTORS AS HIGH ENGAGEMENT PROBABILITY QUESTIONS OPERATION 411, questions represented by question data that include one or more high asking user engagement probability predictors are defined as high engagement probability questions.

In one embodiment, once questions represented by question data that include one or more high asking user engagement probability predictors are defined as high engagement probability questions at DEFINE QUESTIONS REPRESENTED BY QUESTION DATA THAT INCLUDE ONE OR MORE HIGH ASKING USER ENGAGEMENT PROBABILITY PREDICTORS AS HIGH ENGAGEMENT PROBABILITY QUESTIONS OPERATION 411, process flow proceeds to RECEIVE QUESTION DATA REPRESENTING A QUESTION SUBMITTED BY AN ASKING USER THROUGH THE QUESTION AND ANSWER BASED CUSTOMER SUPPORT SYSTEM OPERATION 413.

In one embodiment, at RECEIVE QUESTION DATA REPRESENTING A QUESTION SUBMITTED BY AN ASKING USER THROUGH THE QUESTION AND ANSWER BASED CUSTOMER SUPPORT SYSTEM OPERATION 413, question data is received representing a question submitted by an asking user through the question and answer based customer support system.

As discussed above, in one embodiment, users of the software system are provided the capability to submit product related questions regarding the installation, implementation, use and operation of the software system, as well as subject matter related questions, through the question and answer based customer support system. In one embodiment, an asking user of the software system begins to enter, and/or submit, question data through the question and answer based customer support system and at least a portion of the question data is received by the question and answer based customer support system.

In one embodiment, questions submitted to the question and answer based customer support system by asking users are meant to be answered using the support resources, such as, but not limited to, the time and efforts of members of the support community of customer support personnel.

In various embodiments, the users of the software system enter question data through a question submission user interface provided through the question and answer based customer support system in the form of text data, audio data, symbolic data, and/or any other means, mechanism, process, or system, for entering question data as discussed herein, and/or as known in the art at the time of filing, and/or as developed after the time of filing.

In one embodiment, once question data is received representing a question submitted by an asking user through the question and answer based customer support system at RECEIVE QUESTION DATA REPRESENTING A QUESTION SUBMITTED BY AN ASKING USER THROUGH THE QUESTION AND ANSWER BASED CUSTOMER SUPPORT SYSTEM OPERATION 413, process flow proceeds to BEFORE ALLOCATING SUPPORT RESOURCES TO GENERATING ANSWER DATA RELATED TO THE QUESTION DATA, ANALYZE THE QUESTION DATA TO DETERMINE IF THE QUESTION DATA INCLUDES ONE OR MORE HIGH ASKING USER ENGAGEMENT PROBABILITY PREDICTORS AND THEREFORE REPRESENTS A HIGH ENGAGEMENT PROBABILITY QUESTION OPERATION 415.

In one embodiment at, BEFORE ALLOCATING SUPPORT RESOURCES TO GENERATING ANSWER DATA RELATED TO THE QUESTION DATA, ANALYZE THE QUESTION DATA TO DETERMINE IF THE QUESTION DATA INCLUDES ONE OR MORE HIGH ASKING USER ENGAGEMENT PROBABILITY PREDICTORS AND THEREFORE REPRESENTS A HIGH ENGAGEMENT PROBABILITY QUESTION OPERATION 415, as, or after, the question data is being submitted by an asking user, but before allocating support resources to generating answer data related to the question data, the question data is analyzed to determine if the question data includes one or more high asking user engagement probability predictors and therefore represents a high engagement probability question.

In one embodiment, as the question data is being entered by a user, and/or is otherwise received, the question data is parsed and analyzed before allocating support resources to provide answer data associated with the question data being submitted, as an example, before providing the question data to any of the one or more support personnel. As noted above, in one embodiment, questions submitted to the question and answer based customer support system by asking users are meant to be answered using the support resources, e.g., by members of the support community of customer support personnel. However, using the methods and systems disclosed herein, the question data is parsed and analyzed before allocating any support resources to generating answer data, e.g., providing the question data to any of the one or more support personnel, to determine routing of the question data and/or if the question data represents a high engagement probability question.

As discussed above, in general, product related questions are best answered by paid professional agent support personnel in the employ of the provider of the software system while subject matter related questions are often best answered by volunteer support personnel, e.g., volunteer expert users of the software system. Consequently, in one embodiment, it is desirable to identify the broad category/ subject matter of the questions, e.g., product related questions and subject matter related questions for routing either to professional agent support personnel or volunteer support personnel of the support community for the software system, depending on the subject matter of the question data.

To this end, in one embodiment, an initial parsing and analysis of submitted question data is performed to determine the type of question that is represented by the question data and then make a preliminary determination of what support resources might be allocated to the question data.

In one embodiment, as the question data is being entered and/or submitted, the question data is parsed and analyzed using the high asking user engagement probability predictors and analysis instructions required to identify the high asking user engagement probability predictors.

In one embodiment, if one or more high asking user engagement probability predictors are identified in the question data, the question data is determined to represent a high engagement probability question.

In one embodiment, an asker engagement model computes an asker engagement score using the asker engagement predictors based on logistic regression or a neural network model and the asker engagement score is re-scaled, transformed, or re-normalized to produce an asker engagement probability float number from 0.0 to 1.0 or float number uniformly distributed from 0.0 to 1.0.

In one embodiment once, as, or after, the question data is being submitted by an asking user, but before allocating support resources to generating answer data related to the question data, the question data is analyzed to determine if the question data includes one or more high asking user engagement probability predictors and therefore represents a high engagement probability question at, BEFORE ALLOCATING SUPPORT RESOURCES TO GENERATING ANSWER DATA RELATED TO THE QUESTION DATA, ANALYZE THE QUESTION DATA TO DETERMINE IF THE QUESTION DATA INCLUDES ONE OR MORE HIGH ASKING USER ENGAGEMENT PROBABILITY PREDICTORS AND THEREFORE REPRESENTS A HIGH ENGAGEMENT PROBABILITY QUESTION OPERATION 415, process flow proceeds to IF, BASED ON THE ANALYSIS OF THE QUESTION DATA, A DETERMINATION IS MADE THAT THE QUESTION DATA REPRESENTS A HIGH ENGAGEMENT PROBABILITY QUESTION, ALLOCATE SUPPORT RESOURCES TO GENERATING ANSWER DATA RELATED TO THE QUESTION DATA ON A HIGH PRIORITY BASIS OPERATION 417.

In one embodiment, at IF, BASED ON THE ANALYSIS OF THE QUESTION DATA, A DETERMINATION IS MADE THAT THE QUESTION DATA REPRESENTS A HIGH ENGAGEMENT PROBABILITY QUESTION, ALLOCATE SUPPORT RESOURCES TO GENERATING ANSWER DATA RELATED TO THE QUESTION DATA ON A HIGH PRIORITY BASIS OPERATION 417, if, based on the analysis of the question data, a determination is made that the question data represents a high engagement probability question, support resources are allocated to generating answer data related to the question data on a high priority basis.

In one embodiment, if, based on the analysis of the question data, a determination is made that the question data represents a low engagement probability question, support resources are allocated to generating answer data related to the question data on a low priority basis such that only after all question data representing high engagement probability questions are allocated resources, are any support resources allocated to question data representing low engagement probability questions; in one embodiment, on a first in first out basis, i.e., in the order the question data representing low engagement probability questions is received.

In one embodiment, if, based on the analysis of the question data, a determination is made that the question data represents a low engagement probability question, support resources are never allocated to generating answer data related to the question data.

In one embodiment, once if, based on the analysis of the question data, a determination is made that the question data represents a high engagement probability question, support resources are allocated to generating answer data related to the question data on a high priority basis at IF, BASED ON THE ANALYSIS OF THE QUESTION DATA, A DETERMINATION IS MADE THAT THE QUESTION DATA REPRESENTS A HIGH ENGAGEMENT PROBABILITY QUESTION, ALLOCATE SUPPORT RESOURCES TO GENERATING ANSWER DATA RELATED TO THE QUESTION DATA ON A HIGH PRIORITY BASIS OPERATION 417, process flow proceeds to EXIT OPERATION 430.

In one embodiment, at EXIT OPERATION 430, process 400 for allocating support resources to a question based on analysis of the question content and predicted asker engagement before the answer content is generated is exited to await new data.

Using process 400 for allocating support resources to a question based on analysis of the question content and predicted asker engagement before the answer content is generated, asking user engagement with a question and answer based customer support system, e.g., the asking user's interaction with question and answer based customer support system after the asking user submits their question, is predicted using defined high asking user engagement probability predictors before any significant support resources are allocated to answering the question. Therefore, process 400 for allocating support resources to a question based on analysis of the question content and predicted asker engagement before the answer content is generated, methods and systems are provided to reliably, efficiently, and proactively determine an asking user's predicted engagement with the question and answer based customer support system and then efficiently and effectively allocate support resources, such as volunteer and/or professional agent support personnel of a support community, accordingly. In this way, support resources are not wasted.

Figure 5:
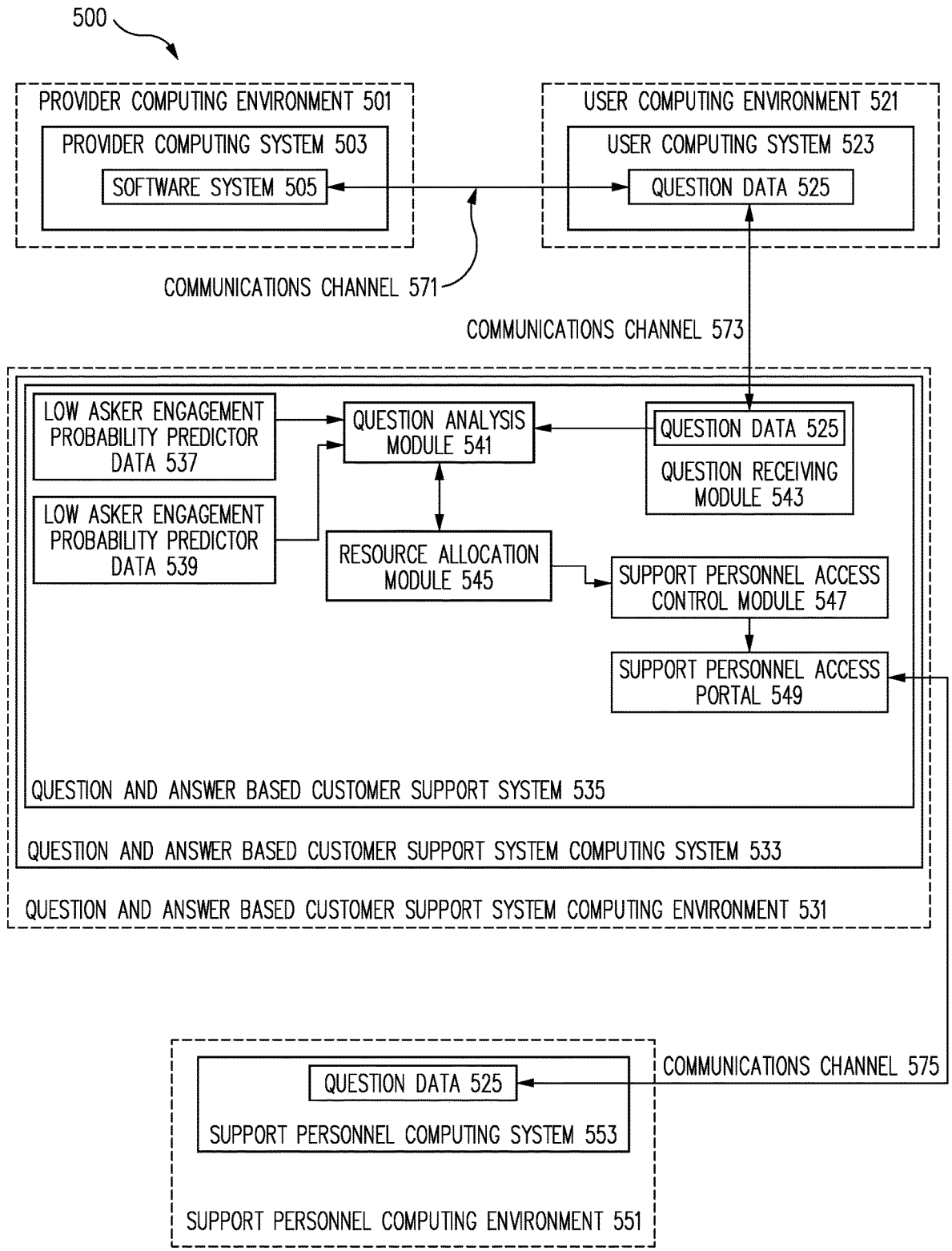
FIG. 5 is a block diagram of a hardware and production environment system 500 for providing a process for allocating support resources to a question based on analysis of the question content and predicted asker engagement before the answer content is generated in accordance with one embodiment.

FIG. 5 is a block diagram of a hardware and production environment system 500 for providing a process for allocating support resources to a question based on analysis of the question content and predicted asker engagement before the answer content is generated in accordance with one embodiment.

As seen in FIG. 5, in one embodiment, a provider computing system 503 is provided in provider computing environment 501 and includes software system 505. In various embodiments, software system 505 is any software system discussed herein, known at the time of filing, and/or as developed after the time of filing.

As also seen in FIG. 5, user computing system 523 is provided in user computing environment 521. In one embodiment, a user of software system 505 accesses provider computing system 503 and software system 505 via communications channel 571.

In one embodiment, the users of software system 505 are also provided a question and answer based customer support system 535 shown as implemented on question and answer based customer support system computing system 533 in question and answer based customer support system computing environment 531.

In one embodiment, through question and answer based customer support system 535, users can submit question data 525 via communications channel 573. In one embodiment, question data 525 entered by the users represents questions to be potentially be provided to one or more support personnel associated with question and answer based customer support system 535. In one embodiment, question data 525 is submitted by the users so that the questions represented by question data 525 can be potentially be answered by at least one of the one or more support personnel associated with support personnel computing system 553 shown as implemented in support personnel computing environment 551.

In one embodiment, low asker engagement probability predictor data 537 representing low asking user engagement probability predictors that when present indicate a low probability of asking user engagement once the asking user has submitted question data representing the asking user's question are defined/identified and recorded in low asker engagement probability predictor data 537. In one embodiment, any identified questions submitted via question data 525 including one or more of the low asker engagement probability predictors represented by low asker engagement probability predictor data 537 are defined/labeled as properly low engagement probability questions.

Alternatively, in one embodiment, high asker engagement probability predictor data 539 representing high asking user engagement probability predictors that when present indicate a high probability of asking user engagement once the asking user has submitted question data representing the asking user's question are defined/identified and recorded. In one embodiment, any identified questions submitted via question data 525 including one or more of the high asker engagement probability predictors represented by high asker engagement probability predictor data 539 are defined/labeled as properly high engagement probability questions.

In one embodiment, when question data 525 representing a question submitted by a user through question and answer based customer support system 535 is being entered by a user, and/or is otherwise received by question and answer based customer support system 535 at question data receiving module 543, via communications channel 573, question data 525 is parsed and analyzed by question analysis module 541 using low asker engagement probability predictor data 537 and/or high asker engagement probability predictor data 539 before providing question data 525 to any of the one or more support personnel at support personnel computing system 553 to answer to the question represented by question data 525 to determine if question data 525 represents an improperly formatted question.

In one embodiment, if, based on the analysis of question data 525 at question analysis module 541, a determination is made that question data 525 represents low engagement probability question, resource allocation module 545 allocates support resources to generating answer data related to the question data on a low priority basis via support personnel access control module 547, support personnel access portal 549 and communicating channel 575.

In one embodiment, if, based on the analysis of question data 525 at question analysis module 541, a determination is made that question data 525 represents high engagement probability question, resource allocation module 545 allocates support resources to generating answer data related to the question data on a high priority basis via support personnel access control module 547, support personnel access portal 549 and communicating channel 575.

Consequently, using the embodiments disclosed herein, asking user engagement with a question and answer based customer support system, e.g., the asking user's interaction with question and answer based customer support system after the asking user submits their question, is predicted using defined low and/or high asking user engagement probability predictors before any significant support resources are allocated to answering the question. Therefore, using the embodiments disclosed herein, methods and systems are provided to reliably, efficiently, and proactively determine an asking user's predicted engagement with the question and answer based customer support system and then efficiently and effectively allocate support resources, such as volunteer and/or professional agent support personnel of a support community, accordingly. In this way, support resources are not wasted.

The disclosed method and system for allocating support resources to a question based on analysis of the question content and predicted asker engagement before the answer content is generated of processes 300 and/or 400, and system 500, as disclosed herein, provides for significant improvements to the technical fields of customer support, information dissemination, software implementation, and user experience. In addition, using processes 300 and/or 400, and system 500, as disclosed herein, results in more efficient use of human and non-human resources, fewer processor cycles being utilized, reduced memory utilization, and less communications bandwidth being utilized to relay data to and from backend systems. As a result, computing systems are transformed into faster, more efficient, and more effective computing systems by implementing processes 300 and/or 400, and system 500, as disclosed herein.

The various embodiments of the disclosure can be implemented to improve the technical fields of customer support, information dissemination, software implementation, and user experience. Therefore, the various described embodiments of the disclosure and their associated benefits amount to significantly more than an abstract idea.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein, are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "accessing," "analyzing," "obtaining," "identifying," "associating," "aggregating," "initiating," "collecting," "creating," "transferring," "storing," "searching," "comparing," "providing," "processing" etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes by a computer program stored via a computer program product as defined herein that can be accessed by a computing system or other device to transform the computing system or other device into a specifically and specially programmed computing system or other device.

Those of skill in the art will readily recognize that the algorithms and operations presented herein are not inherently related to any particular computing system, computer architecture, computer or industry standard, or any other specific apparatus. It may prove convenient/efficient to construct or transform one or more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity, and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s are identified using a particular nomenclature for ease of description and understanding, but other nomenclature is often used in the art to identify equivalent operations.

In the discussion above, certain aspects of one embodiment include process steps and/or operations and/or instructions described herein for illustrative purposes in a particular order and/or grouping. However, the particular order and/or grouping shown and discussed herein is illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein does not limit the scope of the invention as claimed below.

Therefore, numerous variations, whether explicitly provided for by the specification or implied by the specification or not, may be implemented by one of skill in the art in view of this disclosure.

What is claimed is:

1. A method performed by one or more processors of a system, the method comprising:
    providing users of a software system a question and answer based customer support system through which questions can be entered by the users;
    defining low engagement predictors that, when present in a question submitted by a user, indicate a low probability of the user's engagement;
    defining questions that include one or more low engagement predictors as low engagement probability questions;
    receiving, through a question submission user interface, a question submitted by a user through the question and answer based customer support system, the question submission user interface configured to receive, as a component of the question, textual data, audio data and symbolic data;
    parsing the question and analyzing the attributes, subject matter, and format of the question;
    analyzing, before allocating support resources to generate an answer to the question, only the parsed question to determine if the question includes one or more low engagement predictors and therefore represents a low engagement question, the low engagement predictors including at least that the question is improperly punctuated, that the question is in an improper format, that the user is associated with a free version of the software system, and that the user is a new user of the software system;
    upon a determination being made, based on the analysis only of the parsed question, that the question represents a low engagement product question, allocating professional agent support resources to generate an answer on a low priority basis;
    upon a determination being made, based on the analysis only of the parsed question, that the question represents a low engagement subject matter question, allocating volunteer support resources to generate an answer on a low priority basis; and upon a determination that the question represents a low engagement question, support resources are assigned to be used only after all high priority basis questions are allocated resources.

2. The method of claim 1, wherein the low engagement predictors further include at least one of a question length less than a defined threshold question length, a question subject length less than a defined threshold question subject length, the absence of a question mark at the end of the question, improper, or absent, punctuation in the question, the user using the software system for a time period less than a defined threshold time period, or a predicted time to answer the question being greater than a defined threshold time.

3. The method of claim 2, wherein the improper format includes at least one of "Who" question formats, "What" question formats, "When" question formats, "Where" question formats, "Why" question formats, "How" question formats, rhetorical question formats, grammatically incorrect question formats, or ill-formed question formats.

4. The method of claim 1, further comprising before allocating support resources to generate the answer, analyzing the question to determine a type of the question; and based on the determined type of question, identifying a type of support resources to which the question should be routed.

5. The method of claim 1, wherein the support resources include a support community of support personnel for the software system.

6. The method of claim 5, wherein the support community of support personnel for the software system includes volunteer support personnel and professional agent support personnel.

7. The method of claim 6, further comprising:
before allocating support resources to generate the answer, analyzing the question to determine a type of the question;
if the question is identified as directed to subject matter and area of endeavor of the software system, routing the question to the volunteer support personnel on a low priority basis; and
if the question is identified as directed to the software system product, routing the question to the professional agent support personnel on a low priority basis.

8. The method of claim 6, wherein the question and answer based customer support system includes a customer support question and answer database, the customer support question and answer database including question and answer pair data representing one or more questions submitted by users of the software system and the answers to those questions generated using the support resources for the software system; and further wherein the question and answer pair data can be searched and accessed by searching users of the software system.

9. The method of claim 1, wherein the question is submitted by users of the software system through question submission interfaces provided through the question and answer based customer support system, the question submission interfaces including one or more entry fields to enter the question, before allocating support resources to generate the answer, the question to be parsed and analyzed before being allocated any of the support resources to determine if the question includes one or more low engagement predictors and therefore is a low engagement question.

10. The method of claim 1, wherein if, based on the analysis of the question, a determination is made that the question represents a low engagement question, allocating support resources to generate the answer on a low priority basis includes not allocating support resources to generate the answer.

11. A system comprising:
a software system;
a question and answer based customer support system through which questions can be entered by users of the software system;
low engagement predictors that, when present in a question submitted by a user, indicate a low probability of the user's engagement;
a question receiving module for receiving, through a question submission user interface, a question submitted by a user through the question and answer based customer support system, the question submission user interface configured to receive, as a component of the question, textual data, audio data and symbolic data;
a question analysis module for parsing the question and analyzing the attributes, subject matter, and format of the question, the question analysis module further analyzing, before allocating support resources to generate an answer related to the question, only the parsed question to determine if the question includes one or more low engagement predictors and therefore represents a low engagement question, the low engagement predictors including at least that the question is improperly punctuated, that the question is in an improper format, that the user is associated with a free version of the software system, and that the user is a new user of the software system; and
a resource allocation module for allocating support resources to generate the answer, and, upon a determination being made, based on the analysis only of the parsed question, that the question represents a low engagement product question, allocating professional agent support resources to generate the answer on a low priority basis, the resource allocation module further allocating volunteer support resources, upon a determination that the question represents a low engagement subject matter question, the resources allocation module only allocating support resources after all high priority basis questions are allocated resources.

12. The system of claim 11, wherein the low engagement predictors further include at least one of a question length less than a defined threshold question length, a question subject length less than a defined threshold question subject length, the absence of a question mark at the end of the question, improper, or absent, punctuation in the question, the user using the software system for a time period less than a defined threshold time period, or a predicted time to answer the question being greater than a defined threshold time.

13. The system of claim 12, wherein the improper format includes at least one of "Who" question formats, "What" question formats, "When" question formats, "Where" question formats, "Why" question formats, "How" question formats, rhetorical question formats, grammatically incorrect question formats, or ill-formed question formats.

14. The system of claim 11, further comprising before allocating support resources to generate the answer, analyzing the question to determine a type of the question; and based on the determined type of question, identifying a type of support resources to which the question should be routed.

15. The system of claim 11, wherein the support resources include a support community of support personnel for the software system.

16. The system of claim 15, wherein the support community of support personnel for the software system includes volunteer support personnel and professional agent support personnel.

17. The system of claim 16, further comprising:
- before allocating support resources to generate the answer, analyzing the question to determine a type of the question;
- if the question is identified as directed to subject matter and area of endeavor of the software system, routing the question to the volunteer support personnel on a low priority basis; and
- if the question is identified as directed to the software system product, routing the question to the professional agent support personnel on a low priority basis.

18. The system of claim 16, wherein the question and answer based customer support system includes a customer support question and answer database, the customer support question and answer database including question and answer pair data representing one or more questions submitted by users of the software system and answers to those questions generated using the support resources for the software system; and further wherein the question and answer pair data can be searched and accessed by searching users of the software system.

19. The system of claim 11, wherein the question is submitted by users of the software system through question submission interfaces provided through the question and answer based customer support system, the question submission interfaces including one or more entry fields to enter the question, before allocating support resources to generate the answer, the question to be parsed and analyzed before being allocated any of the support resources to determine if the question includes one or more low engagement predictors and therefore is a low engagement question.

20. The system of claim 11, wherein if, based on the analysis of the question, a determination is made that the question represents a low engagement question, allocating support resources to generate the answer on a low priority basis includes not allocating support resources to generate the answer.

* * * * *